(12) United States Patent
Tsuyama et al.

(10) Patent No.: US 7,526,548 B2
(45) Date of Patent: Apr. 28, 2009

(54) DISTRIBUTING AN INFORMATION IMAGE

(75) Inventors: Fumio Tsuyama, Kanagawa (JP); Noriyuki Murata, Tokyo (JP)

(73) Assignee: Sony Corporation, Tokyo (JP)

( * ) Notice: Subject to any disclaimer, the term of this patent is extended or adjusted under 35 U.S.C. 154(b) by 346 days.

(21) Appl. No.: 10/478,887

(22) PCT Filed: Mar. 24, 2003

(86) PCT No.: PCT/JP03/03524

§ 371 (c)(1),
(2), (4) Date: Nov. 26, 2004

(87) PCT Pub. No.: WO03/081437

PCT Pub. Date: Oct. 2, 2003

(65) Prior Publication Data

US 2005/0102397 A1    May 12, 2005

(30) Foreign Application Priority Data

Mar. 25, 2002    (JP)    .............................. 2002-084398

(51) Int. Cl.
*G06F 15/173*    (2006.01)
*G06F 15/16*    (2006.01)
*G06F 17/30*    (2006.01)

(52) U.S. Cl. ........................ 709/225; 709/229; 709/217; 726/28; 726/29; 726/31

(58) Field of Classification Search ................. 709/225, 709/229, 217; 726/28, 29, 31
See application file for complete search history.

(56) References Cited

U.S. PATENT DOCUMENTS

| | | | | |
|---|---|---|---|---|
| 5,724,578 | A * | 3/1998 | Morinaga et al. | 707/100 |
| 5,999,766 | A * | 12/1999 | Hisatomi et al. | 399/80 |
| 6,049,799 | A * | 4/2000 | Mangat et al. | 709/203 |
| 6,192,408 | B1 * | 2/2001 | Vahalia et al. | 709/229 |
| 6,237,099 | B1 * | 5/2001 | Kurokawa | 726/4 |
| 6,684,210 | B1 * | 1/2004 | Takechi et al. | 707/9 |
| 6,882,979 | B1 * | 4/2005 | Reay et al. | 705/26 |
| 6,892,201 | B2 * | 5/2005 | Brown et al. | 707/9 |
| 6,895,503 | B2 * | 5/2005 | Tadayon et al. | 713/168 |
| 7,068,309 | B2 * | 6/2006 | Toyama et al. | 709/219 |
| 7,110,982 | B2 * | 9/2006 | Feldman et al. | 705/51 |
| 7,149,750 | B2 * | 12/2006 | Chadwick | 707/103 R |

(Continued)

FOREIGN PATENT DOCUMENTS

JP    10-188390    7/1998

(Continued)

*Primary Examiner*—Kevin Bates
(74) *Attorney, Agent, or Firm*—Finnegan, Henderson, Farabow, Garrett & Dunner, L.L.P.

(57) ABSTRACT

A content information image and an information image utilizing system with an access right and an authentication function. In the information image utilizing system (100), copy information image data including identifying information (serial ID, master ID, provider ID, version information, and the like) and attribute information (ownership condition, time limit information, and the like) of the content information image is placed in an information image managing server (1002), enabling an information image providing unit to grasp and manage an owner of the information image. Use of the content information image is limited to a client (1005) satisfying the identifying information and the attribute information retained by the content information image.

21 Claims, 14 Drawing Sheets

U.S. PATENT DOCUMENTS 7,469,260 B2 * 12/2008 Enko et al. .................. 707/200

FOREIGN PATENT DOCUMENTS

| JP | 11-259393 | 9/1999 |
| --- | --- | --- |
| JP | 2000-253042 | 9/2000 |
| JP | 2001-092575 | 4/2001 |
| JP | 2001-142825 | 5/2001 |
| JP | 2001-216713 | 8/2001 |
| JP | 2001-337884 | 12/2001 |
| JP | 2002-041392 | 2/2002 |
| JP | 2002-41392 | 2/2002 |
| JP | 2002-51322 | 2/2002 |
| JP | 2002-063467 | 2/2002 |
| JP | 2002-63467 | 2/2002 |
| JP | 2002-163167 | 6/2002 |
| JP | 2003-284031 | 10/2003 |
| JP | 3622913 | 12/2004 |

* cited by examiner

FIG. 6

```
<icon
        title="LET'S GO HOME"
601     icon_id="fuon://fuon.ccc.co.jp/icon/uuu/go-home"
602     version="1"
603     category="content_icon"
604     own="disable"
605     offline="enable"
606     recommend="enable">
  ...
<action event="offline">
  <property sequence="1" property_id="6"/>
</action>

607  <property
        property_id="1"
        visible="true"
        title="○○○ OFFICIAL HP"
        >
     <reference
        content_type="text/html;relative"
        location="fuon://fuon.ccc.co.jp/ref/uuu/intro_html_url"
        condition="default"
     />
     </property>

608  <property
        property_id="5"
        visible="true"
        title="REPRODUCTION"
        valid_condition="required_private_data:streaming_key;..."
        >
      ...
     <reference
        content_type="audio/x-pn-realaudio;relative"
        location="fuon://fuon.ccc.co.jp/ref/uuu/pn_ra_param"
        valid_condition="required_private_data:streaming_key;..."
     />
     </property>

...
</icon>
```

| USER ID | PASS-WORD | USER ATTRIBUTE | FOLDER MANAGING SERVER LOCATION | INFORMATION IMAGE MANAGING SERVER LOCATION |
|---|---|---|---|---|
| U01 | xxxxx | YAMAMOTO | 155.11.11.01 | 200.33.11.01 |
| U02 | yyyyy | KATO | 155.11.22.01 | 169.11.55.01 |

FIG. 9

| USER ID | MASTER ID OR SERIAL ID |
|---|---|
| U01 | M01, SU21, SC31 |
| U02 | M02, SC40 |
| U03 | M03, S001 |

F I G. 1 1
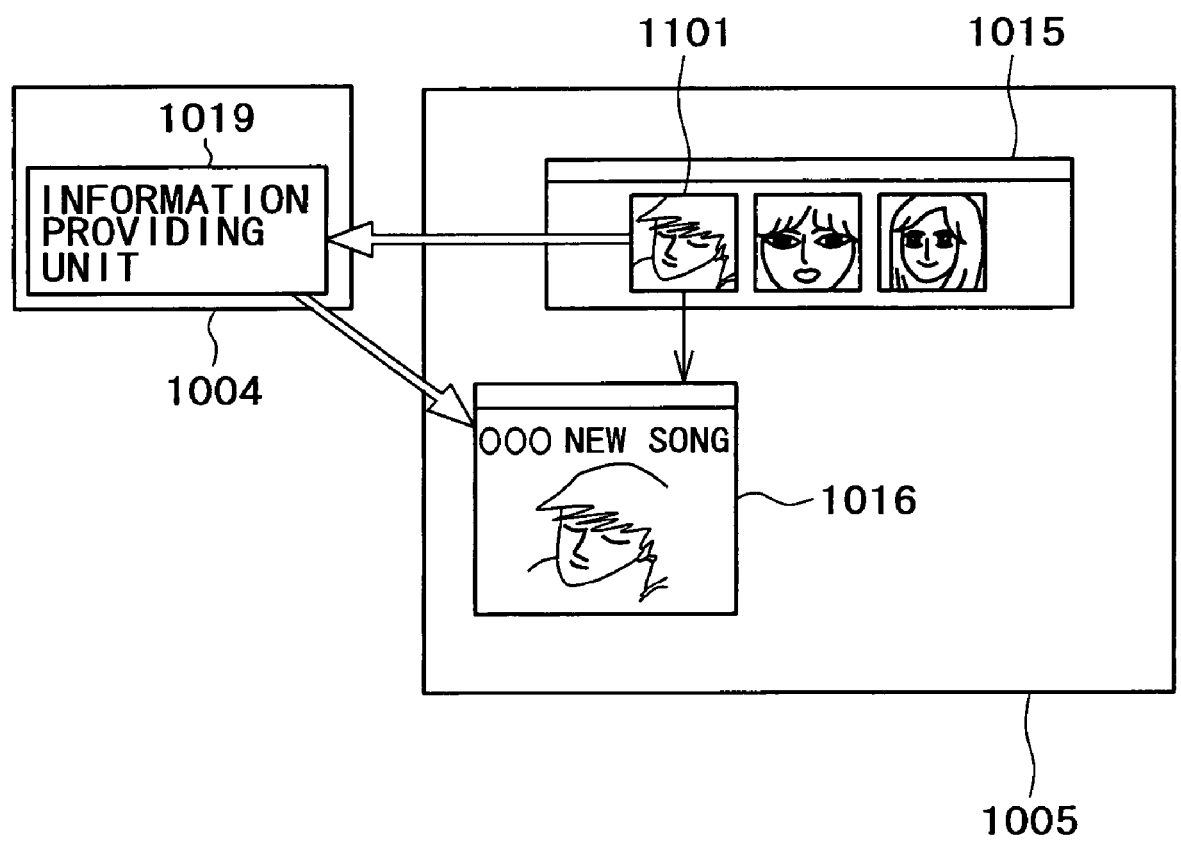

DISTRIBUTING AN INFORMATION IMAGE

TECHNICAL FIELD

The present invention relates to information manipulation performed between information processing apparatus interconnected via a network such as the Internet or the like. The present invention relates to an information image utilizing system realized via an "information image" formed by combining image information and related information for causing an operator to perform predetermined operation on the basis of the image information into one handling unit.

BACKGROUND ART

It has recently been common for general users to connect a computer to a network and obtain various information via the network. A user can access an information disclosing server using an information terminal apparatus such as a computer or the like and obtain desired information.

As an effective method for providing information on the Internet, a method has been proposed using an "information image" formed by image information and related information for causing predetermined operation to be performed on the basis of the image information. The image information and the related information are processed as one handling unit. The information image is easy to manage because an image file and a plurality of pieces of related information are managed as one handling unit.

Supposing that the information image is related to a specific singer, for example, the image file is an image of the singer or an image related to the singer. The related information included in the information image is an address (URL) of a home page of the singer, song data (audio data), a profile (text data) of the singer and the like.

A user can display an owned information image using an information image browser of the information terminal owned by the user and use the content of the selected information image.

For example, Japanese Patent Laid-open No. 2001-92575 relates to a GUI of a PC connected to a plurality of apparatus. Icons corresponding to the connected apparatus are displayed on a monitor, and states of the apparatus are displayed by changing forms of display of the icons. However, the icons themselves do not include information on the states of the apparatus or the like.

Further, in Japanese Patent Laid-open No. 2001-142825, a state of connection of an information apparatus is visually recognized on a computer, and operation of the apparatus is performed by operation by a "gaze-link" metaphor. However, connection between an image and the operated apparatus does not involve connection restriction or a function related to authentication.

Further, in Japanese Patent Laid-open No. 2001-216713, on a computer connected to an operated apparatus, a state of connection of the operated apparatus is displayed by icon, and operation of the operated apparatus is displayed by icon (a video recording icon, a reproduction icon, a recording programming icon, and the like), so that an operator makes setting and the like by a simple operation. However, the icons indicate the operated apparatus itself or the operation, and the icons themselves do not include other information. In addition, there is no restriction of connection from the icons to the apparatus or the like, and there is no function related to authentication.

Further, in Japanese Patent Laid-open No. Hei 11-259393, an apparatus with which communication is to be made is displayed by icon on a personal computer, and the apparatus with which communication is to be made is identified through icon operation to make communication. However, there is no connection restriction for the icon, and there is no function related to authentication.

Further, Japanese Patent Laid-open No. Hei 10-188390 realizes simple recording programming by dragging and dropping a program icon into a time period display part of a recording apparatus. However, there is no restriction on use of the program icon or no function related to authentication.

However, after the user selects the information image displayed on the information image browser of the information terminal, the information image is accessed without any restriction, and thus the use of the information image once provided by the information image providing unit is not restricted.

For example, in a case where the information image providing unit provides the information image for a limited time period, the information image cannot be accessed from the user after an end of the providing time period, but the information image without an access right remains at the user. In addition, when the information image providing unit desires to stop information distribution only to a specific user, there is no means of realizing this.

Further, there is no means for the information providing unit side to restrict and manage for each user attachment of the information image owned by the user to an email, which is send to a friend or the like, and including the information image in a flexible disk for takeout, for example. Further, once the information image is provided to the user, it is impossible to change a period of use of the information image, change ownership restriction (change the restriction that prohibits assigning the information image to another person at the time of providing the information image and allow the information image to be assigned after passage of a certain period), for example, after providing the information image.

The present invention has been made in view of such problems, and it is accordingly an object of the present invention to provide a content information image and an information image utilizing system with an access right and an authentication function.

DISCLOSURE OF INVENTION

In order to achieve the above object, according to a first invention, there is provided an information image utilizing system including one or a plurality of information image managing servers, one or a plurality of folder managing servers, a user managing server, one or a plurality of information image providing servers, and one or a plurality of clients; the one or plurality of information image managing servers, the one or plurality of folder managing servers, the user managing server, the one or plurality of information image providing servers, and the one or plurality of clients being connected to each other via a network; and information being provided from the information image providing server to the client via an information image formed by combining image information and related information for causing predetermined operation to be performed on the basis of the image information into one handling unit. (a) the one or plurality of information image managing servers generate a first information image by including identifying information including an identifier of the information image providing server in the information image and retain the first information image, generate a second information image by including attribute information indicating an access right for each identifier of the client of an owner and for each predetermined operation in the first information image and retain the second information image, and retain an information image managing table associating an identifier of the first information image, the identifier of the information image providing server, an identifier of the second information image, and the identifier of the client with each other. (b) the one or plurality of folder managing servers retain a folder managing table associating the identifier of the client with the identifier of the second information image owned by the client. (c) the user managing server authenticates the client and the information image providing server, and retains a user managing table associating the identifier of the client with the folder managing server and associating the identifier of the information image providing server with the information image managing server. (d) the client communicates with the folder managing server, displays the second information image owned by the client, and performs the predetermined operation on the basis of the related information and the attribute information included in the second information image.

According to the first invention, the one or plurality of information image managing servers generate a first information image by including identifying information including an identifier (provider user ID) of the information image providing server in the information image and retain the first information image, generate a second information image by including attribute information indicating an access right for each predetermined operation in the first information image and retain the second information image, and retain an information image managing table associating an identifier (master ID) of the first information image, the identifier (provider user ID) of the first client, an identifier (serial ID) of the second information image, and the identifier (owner user ID) of the second client with each other.

The one or plurality of folder managing servers retain a folder managing table associating the identifier (owner user ID) of the client using the information image with the identifier (serial ID) of the second information image owned by the client using the information image. A part or the whole of information image data of the second information image may be recorded.

The user managing server manages the identifier (owner user ID) of the client using the information image or the identifier (provider user ID) of an information image providing unit, a password, a user attribute, a folder managing server location, and an information image managing server location. The user managing server functions as user managing and authenticating means.

The client communicates with a folder managing unit, displays the second information image owned by the client, and performs the predetermined operation on the basis of the related information and the attribute information included in the second information image.

When a content of the folder managing table is changed, that is, when the owner of the second information image is changed (transfer), the information image managing server reflects the change in the information image managing table. In response to a request from the information image providing server, the information image managing server extracts the identifier of the client owning the second information image indicating the information image providing server on the basis of the information image managing table and then transmits the identifier to the information image providing server.

When the information image managing server receives from the information image providing server an instruction to change the attribute information included in the second information image, an instruction to change the related information included in the second information image, or an instruction to delete the second information image, the information image managing server updates the information image managing table on the basis of the instruction, and the folder managing server updates the folder managing table on the basis of the update.

The "network," as typified by the Internet, allows information data formatted in accordance with a predetermined protocol to be distributed bidirectionally. Also, the network may be formed by radio or wire.

The "information image" is formed by combining image information, related information for causing an operator to perform predetermined operation on the basis of the image information, and the like into one handling unit. The information image allows an operation such for example as transmission thereof on the network to be realized by a single handling process. Incidentally, information images are classified into "master information images" and "copy information images." The "first information image" is a "master information image." The "second information image" is a "copy information image." Further, the information image may be formed by electronic data described in a markup language such for example as XML (EXTENSIBLE MARKUP LANGUAGE) data.

The "master information image" is an information image managed by the information image providing unit, and change of a content or the like of the master information image is performed by the information image providing unit. The master information image has identifying information (master ID, provider user ID, version, category, and the like) for identifying the master information image.

The "copy information image" is generated on the basis of the master information image. As with the master information image, the copy information image has identifying information (serial ID, version, category, master ID, master location, provider user ID, and the like) for identifying the copy information image. The copy information image is generated on the basis of the master information image, and attribute information and the like are added to the copy information image. When the copy information image comes to be owned by the operator of the client, the attribute information and the like are set for each such client. Hence, even copy information images generated on the basis of the same master information image can have different functions for different clients.

The "image information" is identifiable on the basis of image identifying information such for example as a file name or identifying information embedded within the image information. The image information functions to be displayed as an image on an information display device as the client. More specifically, the image information is data streams related to images employing various formats such as a GIF format, a JPG format, a PCX format, and the like.

The "related information" serves as a basis when an operator of a terminal is desired to perform the "predetermined operation" on the basis of the information image. That is, the related information is related to the information image or the image information.

The "predetermined operation" is for example reproduction of the related information included in the information image, processing for owning the information image, processing for updating the information image, processing for recommending the information image, processing for assigning the information image, or the like.

The "reproduction of the related information included in the information image" is reproduction of music when the related information is a music content, reproduction of moving image video when the related information is a moving image video content, and reproduction (display) of text information when the related information is text information or the like.

The "processing for owning the information image" is processing in which the user (client) owns the information image not owned yet (for example an information image being distributed for promotion). Specifically, the processing for owning the information image refers to a series of processes in which the information image managing server gives a serial ID for associating the information image with the owner to the information image (copy information image), and contents of the folder managing table and the user managing table are updated.

The "processing for updating the information image" is processing in which the information of the information image is updated on the basis of an instruction from the information image providing unit. Specifically, the processing updates the master information image (upgrade) and correspondingly updates the copy information image (upgrade) or updates the attribute information or the like.

The "processing for recommending the information image" is processing in which the user (client) replicates the information image (when the attribute information indicates that the information image can be retained in a plurality of folders, which will be described later) and recommends the information image to another user. The replicated information image is sent to the other user via an email attachment or a recording medium.

The "processing for assigning the information image" is processing in which the information image owned by the user (client) is assigned to another user (when the attribute information indicates that the information image can be assigned, which will be described later). While the user that the information image has been assigned to can own and use the assigned information image, the user that has assigned the information image cannot own or use the assigned information image.

These processes will be described later.

The "identifying information" is information for identifying the information image. In the case of a master information image, the identifying information is a master ID unique in the information image utilizing system, a provider user ID, a version, a category of the information image, and the like. In the case of a copy information image, the identifying information is a serial ID unique in the information image utilizing system, a version, a category of the information image, a master ID of a source from which the copy information image is generated, a location of the master information image (master location), a provider user ID, and the like.

The "attribute information" defines the handling of information related to the copy information image. When the copy information image comes to be owned by the operator of the client, the attribute information and the like are set for each such client. The attribute information can also be set for each predetermined operation. Further, the attribute information can be changed afterward by the provider of the information image. The attribute information indicates plural holdability, off-lining ability, ownability, assignability, recommendability, an expiration date, whether there is ownership management, a signature, a certificate, and the like.

In a case where music contents and moving image contents are rented (lent), for example, the "expiration date" is included in the attribute information of the information image indicating the contents, whereby a rental period management for the contents can be performed.

The client is what is called an information terminal apparatus, an information display apparatus, or simply an apparatus referred to as a terminal or the like. The client includes for example a personal computer, a portable information terminal, a portable telephone, a household electric appliance having an information terminal function, and the like. The client at least has a function of incorporating information image processing means and displaying and manipulating information images.

The information image has various functions related to communication, information exchange, and the like owing to the related information included in the information image. The information image including information (text information, an URL, an IP address, a specific program, or the like) for providing contents such as music, video, a game, or the like, in particular, will be referred to as a "content information image."

The information image providing unit is a provider of the content information image. For example, the information image providing unit provides a new song of a specific singer or the like as the information image. Specifically, the information image providing unit sets a picture of the singer as image information and includes information such as song data, lyric data, an HP address of the singer, and the like in the related information. Alternatively, the information image providing unit can be an apparatus. For example, a TV drama recorded on a recording apparatus can form a content information image.

Further, whether the information image can be used (which corresponds to an access right) for each predetermined operation (use item) defined in the related information can be set in the attribute information included in the information image. Further, whether the information image can be used can be set for each owner of the information image.

The content information image providing unit (information image providing server) indicated by the content information image can change the attribute information of the content information image (copy information image) owned by the client (content information image owner). Thus, in a case where the content information image of the content information image providing unit is owned by an unintended user because of replication or for another reason, or in a case where the use by a certain owner of the content information image of the content information image providing unit is desired to be limited, the content information image providing unit can deal with these cases by changing the attribute information of the content information image owned by the owner or deleting the content information image owned by the owner. That is, it is possible not only to limit the use of the content information image beforehand, but also to deal with situations occurring afterward such for example as sending of unsolicited information images via the content information image. That is, through the medium of the content information image, the provider side can grasp a history of distribution of the content information image and also limit the use of the content information image by each client.

According to a second invention, there is provided an information image managing apparatus connected to one or a plurality of information image providing servers and one or a plurality of clients via a network, the information image managing apparatus managing an information image formed by combining image information and related information for causing predetermined operation to be performed on the basis of the image information into one handling unit, and the information image serving as a medium for providing information from the information image providing server to the client. The information image managing apparatus includes one or a plurality of information image managing servers for generating a first information image by including identifying information including an identifier of the information image providing server in the information image and retaining the first information image, generating a second information image by including attribute information indicating an access right for each predetermined operation in the first information image and retaining the second information image, and retaining an information image managing table associating an identifier of the first information image, the identifier of the information image providing server, an identifier of the second information image, and an identifier of the client with each other.

The second invention relates to the information image managing apparatus in the information image utilizing system of the first invention.

According to a third invention, there is provided an information image managing method of an information image managing apparatus, the information image managing apparatus being connected to one or a plurality of information image providing servers and one or a plurality of clients via a network and managing an information image formed by combining image information and related information for causing predetermined operation to be performed on the basis of the image information into one handling unit, the information image serving as a medium for providing information from the information image providing server to the client. The information image managing method includes an information image managing step for generating a first information image by including identifying information including an identifier of the information image providing server in the information image and retaining the first information image, generating a second information image by including attribute information indicating an access right for each predetermined operation in the first information image and retaining the second information image, and retaining an information image managing table associating an identifier of the first information image, the identifier of the information image providing server, an identifier of the second information image, and an identifier of the client with each other.

The third invention relates to the information image managing method of the information image managing apparatus of the second invention.

According to a fourth invention, there is provided a content information image including image information, related information for causing predetermined operation to be performed on the basis of the image information, identifying information including an identifier of an information image providing server connected via a network, and attribute information including an access right for each predetermined operation and each owner; the image information, the related information, the identifying information, and the attribute information being combined into one handling unit; and the information image serving as a medium for providing information from the information image providing server to a client.

The fourth invention relates to the information image according to the first to third inventions.

According to a fifth invention, there is provided a program for making a computer function as the information image managing apparatus of the first invention.

According to a sixth invention, there is provided a recording medium on which a program for making a computer function as the information image managing apparatus of the first invention is recorded.

The "recording medium" is a CD-ROM, a DVD, a flexible disk, a hard disk, or the like.

BRIEF DESCRIPTION OF THE DRAWINGS

FIG. 6 is a diagram illustrating an example of data structure of an information image realized by XML data;

FIG. 9 is a diagram showing a folder managing table 901 retained and managed by a folder managing unit 113 of a folder managing server 103;

FIG. 11 is a diagram illustrating use of a content information image;

BEST MODE FOR CARRYING OUT THE INVENTION

Figure 1:
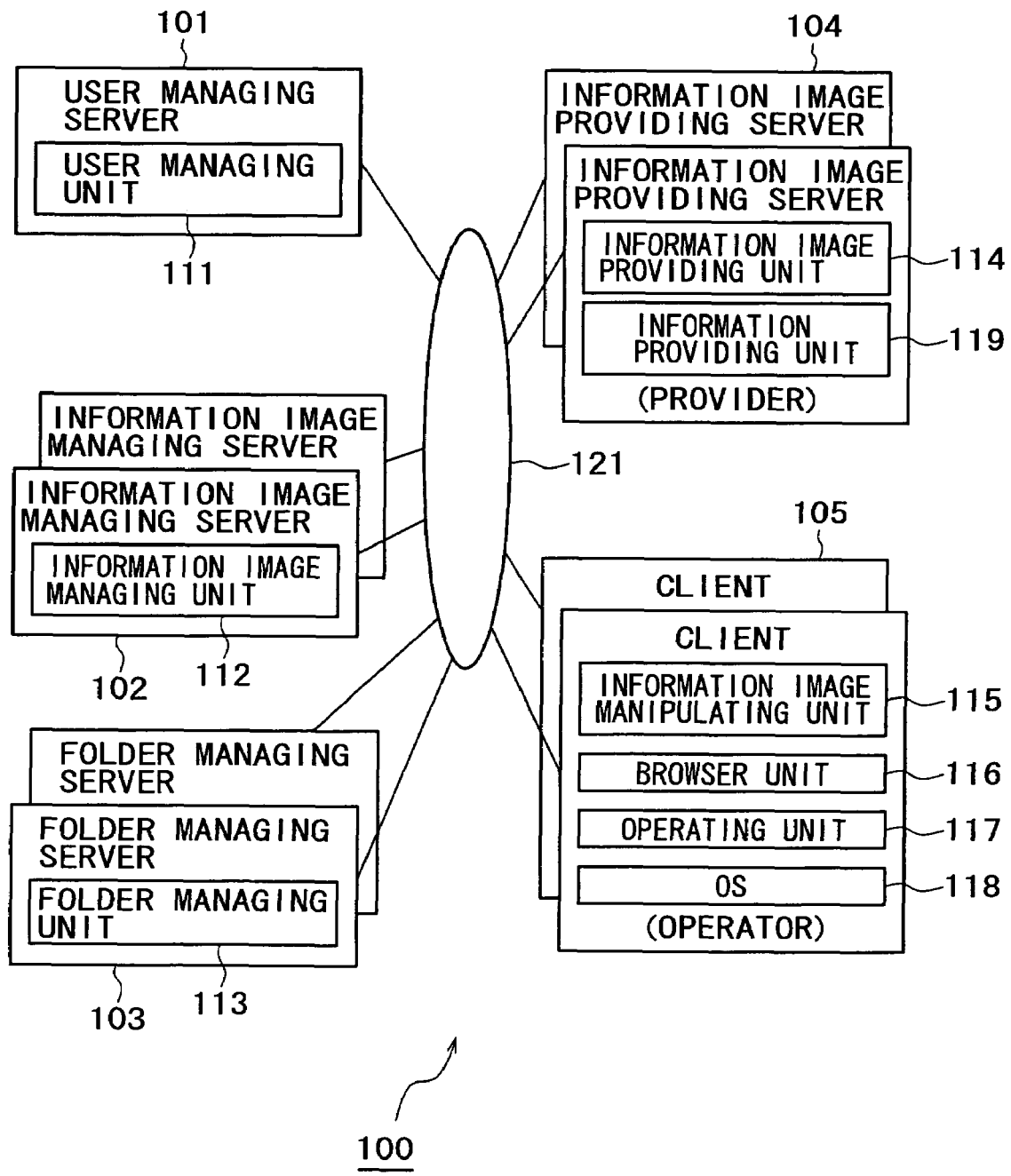
FIG. 1 is a schematic block diagram of an information image utilizing system 100.

A preferred embodiment of an information image utilizing system and the like according to the present invention will hereinafter be described in detail with reference to the accompanying drawings. In the following description and the accompanying drawings, components having substantially the same functions and configurations are identified by the same reference numerals, and repeated description thereof will be omitted.

(1. System Configuration of Information Image Utilizing System)

A system configuration of an information image utilizing system according to the present embodiment will first be described with reference to FIG. 1. FIG. 1 is a schematic block diagram of the information image utilizing system 100. As shown in FIG. 1, the information image utilizing system 100 employs a configuration in which a user managing server 101, an information image managing server 102, a folder managing server 103, an information image providing server 104, and a client 105 capable of including an information image processing device according to the present embodiment and displaying an information image manipulating unit 115 and a browser unit 116 are connected to each other via a network 121 such as the Internet for enabling two-way communication.

Information exchanged via the network 121 is mainly an information image, various information derived via the information image, the information image processing device for enabling the use of the information image on the client side, attribute information attached to the information image, manipulation information of the information image by the client, and the like. These will be described later in detail.

The user managing server 101 is an information processing apparatus such as a computer or the like. The server 101 authenticates a user using the information image utilizing system 100. The user managing server 101 has a user managing unit 111. The user managing unit 111 retains and manages information related to the user. In another embodiment, the user managing server 101 has a function of managing information image manipulation information and performing predetermined billing processing by co-operating with the information image managing server 102 and the folder managing server 103.

Incidentally, while the "user" is generally a user of the information image utilizing system 100, to facilitate understanding, description will be made assuming that the user includes an information image providing unit ("provider") of the information image providing server 104 and an operator ("operator") of the client 105. However, as later described, the information image providing server and the client can be made to function as an integral apparatus, that is, one apparatus (computer, information portable terminal, portable telephone, various equipment, electric appliance, or the like) can be made to function as the information image providing server or operate as the client. Hence, though users may be divided into operators and providers to facilitate understanding, one user can of course be an operator and provider in practice.

The information image managing server 102 is a server apparatus such as a computer connected to a terminal via the network or the like. The information image managing server 102 has a function of managing the manipulation information of an information image by each client and the like. Also, as later described, the information image managing server 102 has a function of combining image information, identifying information (a master ID, a provider user ID, a version, a category, and the like), and related information for causing an operator to perform predetermined operation on the basis of the image information into a master information image as one handling unit.

Further, when generating a copy information image on the basis of the master information image, the information image managing server 102 incorporates attribute information and the like related to the copy information image. The information image managing server 102 has an information image managing unit 112 for retaining and managing information (master information image data) related to the master information image and information (copy information image data) related to the copy information image. The attribute information related to the copy information image is inputted to the information image managing unit 112 by the provider.

In another embodiment, the information image managing server 102 has functions of providing an information image support program as the information image processing device in response to a request from a client and managing user related information transmitted from the client in exchange for the provision of the information image processing device.

The folder managing server 103 has a folder managing unit 113 for managing a folder retaining information disclosed for each user. That is, the folder managing server 103 has a folder provided therein exclusively for each user. Any information may be retained and managed for each user in the folder managing unit 113; in this case, however, the information is information images owned by the user.

The information image providing server 104 is also an information processing apparatus such as a computer or the like. The information image providing server 104 is configured as an information image disclosing server to allow perusal of registered information images, for example. The information image providing server 104 functions to provide an information image, information related to the information image, and other information to a client 105 that has accessed the information image providing server 104 via the network 121.

Information images are provided by an information image providing unit 114, and information (contents and the like) related to the information images is provided by an information providing unit 119. The information images are provided via the information image managing server 102. Since the information image managing server 102 can be decentralized, the information image providing server 104 and the information image managing server 102 may be configured as one.

In another embodiment, when the client 105 does not own the information image support program as the information image processing device necessary for displaying and manipulating information images, the information image providing server 104 also functions to provide the information image processing device.

The client 105 is a so-called information terminal apparatus, and at least has a function of incorporating the information image processing means and displaying and manipulating information images. More specifically, the client includes for example a personal computer, a portable information terminal, a portable telephone, a household electric appliance having an information terminal function, and the like.

The client 105 displays the information image manipulating unit 115 and the browser unit 116. The operator of the client manipulates an information image owned by the operator. The information image is displayed on the information image manipulating unit 115. The client 105 displays information related to the information image on the browser unit 116 or starts and executes an application related to the information image. In the case where the information image is related to a musical artist, when a predetermined manipulation is performed on the information image, the client 105 downloads musical data related to the information image from the information providing unit 119 of the information image providing server 104, starts a playing program, and then plays the music.

It is to be noted that while the user managing server 101, the information image managing server 102, the folder managing server 103, the information image providing server 104, and the client 105 are each formed as separate hardware in the example shown in FIG. 1, the user managing server 101, the information image managing server 102, the folder managing server 103, the information image providing server 104, and the client 105 can be formed by common hardware in an arbitrary combination, depending on the system configuration.

The information image managing server 102 and the folder managing server 103 can be decentralized. The decentralization can be realized by retaining and managing locations of the information image managing server and the folder managing server for each user in the user managing unit 111, for example.

The network 121, as typified by the Internet, is configured so as to allow information data formatted in accordance with a predetermined protocol to be distributed bidirectionally. It is to be noted that while the network 121 in the present embodiment is the Internet configured so as to be open to the public, a closed environment such for example as a LAN or a WAN can be configured, depending on the system configuration. Also, the network 121 may be formed by radio or wire.

(2. Structure of Information Image)

A structure of an information image playing a central role in the information image utilizing system shown in FIG. 1 will next be described in detail.

The "information image" handled in the present embodiment is formed by combining image information, related information for causing an operator to perform predetermined operation on the basis of the image information, and the like into one handling unit. The information image allows an operation such for example as transmission thereof on the network to be realized by a single handling process. Incidentally, "information images" are classified into "master information images" and "copy information images."

A "master information image" is an information image managed by the information image providing unit, and change of a content or the like of the master information image is performed by the information image providing unit. The master information image is retained and managed by the information image managing server 102, and replication, movement, or the like of the master information image is not performed. The master information image has identifying information (master ID, provider user ID, version, category, and the like) for identifying the master information image.

A "copy information image" is generated on the basis of the master information image. As with the master information image, the copy information image has identifying information (serial ID, version, category, master ID, master location, provider user ID, and the like) for identifying the copy information image. The copy information image is generated on the basis of the master information image, and attribute information and the like are added to the copy information image. When the copy information image comes to be owned by the operator of the client, the attribute information and the like are set for each such client. Hence, even copy information images generated on the basis of the same master information image can have different functions for different clients.

Thus, the information image has major characteristics in that (1) the information image includes image information, related information, identifying information, attribute information, and the like, and (2) the image information, related information, identifying information, attribute information, and the like can be processed as one handling unit.

(2.1. Image Information)

The "image information" is identifiable on the basis of image identifying information such for example as a file name or identifying information embedded within the image information. The image information functions to be displayed as an image on an information display device as the client. More specifically, the image information is data streams related to images employing various formats such as a GIF format, a JPG format, a PCX format, and the like.

(2.2 Related Information)

The "related information" serves as a basis when an operator of a terminal is desired to perform a specific operation on the basis of the image information. That is, the related information is related to the information image or the image information, and when the operator of the terminal is desired to refer to information in a specific server, for example, information (IP (Internet Protocol) address, URL (Uniform Resource Locator), or the like) identifying the information in the server corresponds to the related information. When a specific program is desired to be operated, the related information may be a name of the program or the program itself. The related information can be instruction information for giving an instruction to obtain new image information from a server, for example.

(2.3. Identifying Information)

The "identifying information" is information for identifying the information image. In the case of the master information image, the identifying information is the master ID unique in the information image utilizing system, the provider user ID, the version, the category of the information image, and the like. In the case of the copy information image, the identifying information is the serial ID unique in the information image utilizing system, the version, the category of the information image, the master ID of the source from which the copy information image is generated, the location of the master information image (master location), the provider user ID, and the like. By comparing the version of the master information image with the version of the copy information image, it is possible to determine whether the version of the copy information image is the latest version.

(2.4. Attribute Information)

The "attribute information" defines the handling of information related to the copy information image. When the copy information image comes to be owned by the operator of the client, the attribute information and the like are set for each such client. The attribute information can be changed afterward by the provider of the information image. The attribute information indicates plural holdability, off-lining ability, ownability, assignability, recommendability, an expiration date, whether there is ownership management, a signature, a certificate, and the like.

The "plural holdability" indicates whether the copy information image can be present in a plurality of folders each related to an identical user on the folder managing server.

The "off-lining ability" indicates whether the copy information image can be made offline (Export).

The "ownability" indicates whether the copy information image can be owned, that is, whether the copy information image can be registered in a folder on the folder managing server.

The "assignability" indicates whether the copy information image can be assigned, that is, whether the copy information image can be moved between folders on the folder managing server (registration change between the folders).

The "recommendability" indicates whether the copy information image can be recommended to another user, that is, whether the copy information image can be registered in a folder of the other user on the folder managing server.

The "expiration date" indicates, in the information image utilizing system, a term of validity of the copy information image in the information image utilizing system 100. When the expiration date has passed, the copy information image is automatically deleted. Also, it is possible to prohibit manipulation of the information image after the passage of the expiration date, nullify a report of a manipulation log of the information image to the managing server after the passage of the expiration date, or specify that a predetermined operation be allowed only after the passage of the expiration date. In a case where music contents and moving image contents are rented (lent), for example, the "expiration date" is included in the attribute information of the information image indicating the contents, whereby a rental period management for the contents can be performed.

"Whether there is ownership management" indicates whether the user ID related to ownership of the copy information image is to be notified to the information image managing server when the copy information image is owned or deleted.

The "signature and certificate" are used for authentication or the like.

In order to allow the image information, related information, identifying information, attribute information, and the like formed as described above to be processed as one handling unit, according to the present embodiment, the related information and other information can be embedded in specific image information by using a method as described in the following.

(2.5. Configuration of Information Image Including Information)

A configuration of an information image including related information, identifying information, attribute information, and the like will be described with reference to FIGS. 2 to 5. Incidentally, the information included in the information image can be for example the related information, identifying information, attribute information, and an identifier for identifying the image.

(2.5.1. Format of Master Information Image—1)

Figure 2:
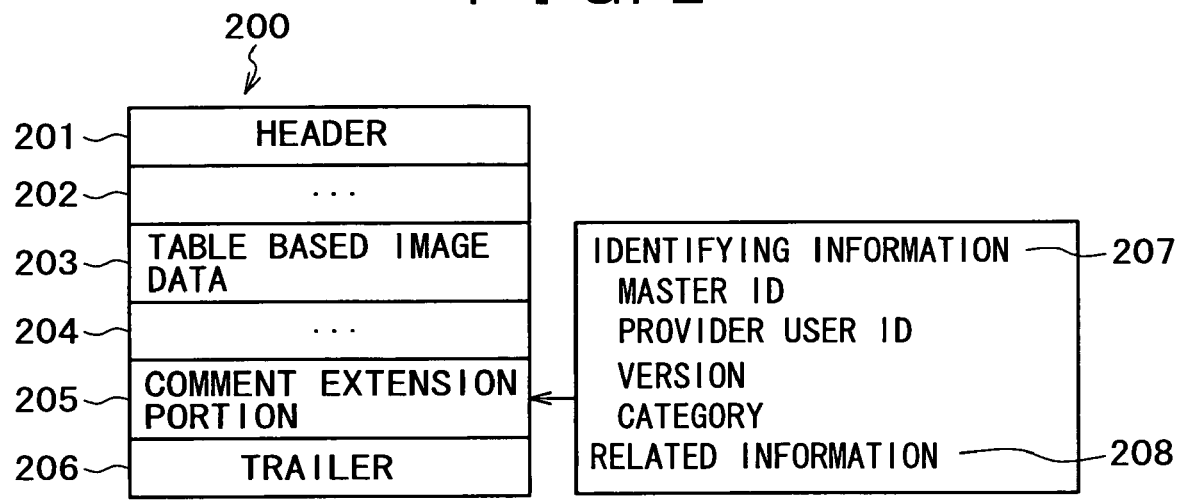
FIG. 2 is a diagram illustrating master information image data 200.

FIG. 2 is a diagram illustrating master information image data 200 as a format of a master information image having related information and identifying information embedded therein.

In this case, an image in a GIF format is taken as an example of image information. It is to be noted that instead of the GIF format, a JPG format, a PCX format, or the like may be employed as the format of the image data.

A header 201 is a field provided to identify this information as image information in the GIF format. The header 201 is assigned a character string of "GIF" and a version thereof.

Table based image data 203 is image data in which predetermined pixels are arranged from a left to a right and from a top to a bottom. In the case of the GIF, the data is coded by using an LZW algorithm for variable-length code.

A comment extension portion 205 includes text information that does not constitute graphic information in the GIF data stream. The comment extension portion 205 can include comments on a graphic, a name of a person concerned in production, content description, or control information, information not of a graphic data kind, and all other information.

A trailer 206 indicates that the continuous data stream started with the header 201 is ended. The trailer 206 signifies that the trailer 206 is not followed by other parameter information or the like.

A portion 202 between the header 201 and the table based image data 203, and a portion 204 between the table based image data 203 and the comment extension portion 205 can include information other than the above-described information. The portion 202 and the portion 204 can be assigned information including parameters defining an area of the display device. The information is necessary for an image to be rendered, such as a screen width, a screen height, and color resolution, for example.

Identifying information 207 (master ID, provider user ID, version, category and the like) and related information 208 are disposed in the comment extension portion 205 as they are or after being subjected to processing such as encryption and the like. The identifying information 207 and the related information 208 are thus combined into one piece of image information. As a result of this, the image information as a data stream can include the related information and the identifiers therewithin.

While all these descriptions have been made by taking the GIF format as an example, another image format may be used as long as the related information and the identifying information are thus recorded in an area separated from the image information.

(2.5.2. Format of Copy Information Image—1)

Figure 3:
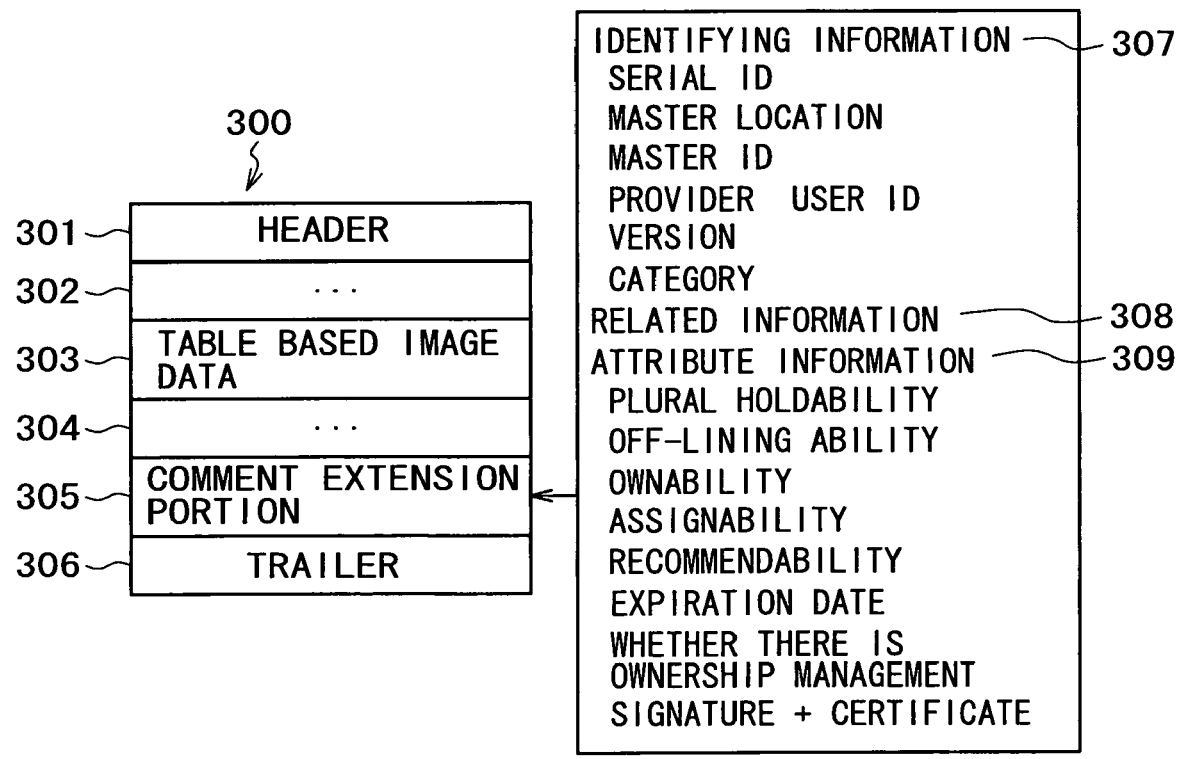
FIG. 3 is a diagram illustrating copy information image data 300.

FIG. 3 is a diagram illustrating copy information image data 300 as a format of a copy information image having related information, identifying information, and attribute information embedded therein.

The format of the copy information image is similar to the format of the above-described master information image. However, in the case of the format of the copy information image, attribute information 309 (plural holdability, off-lining ability, ownability, assignability, expiration date, whether there is ownership management, signature, and certificate) is disposed in a comment extension portion 305 together with identifying information 307 (serial ID, version, category, master ID, master location, provider user ID, and the like) and related information 308.

(2.5.3. Format of Master Information Image—2)

Figure 4:
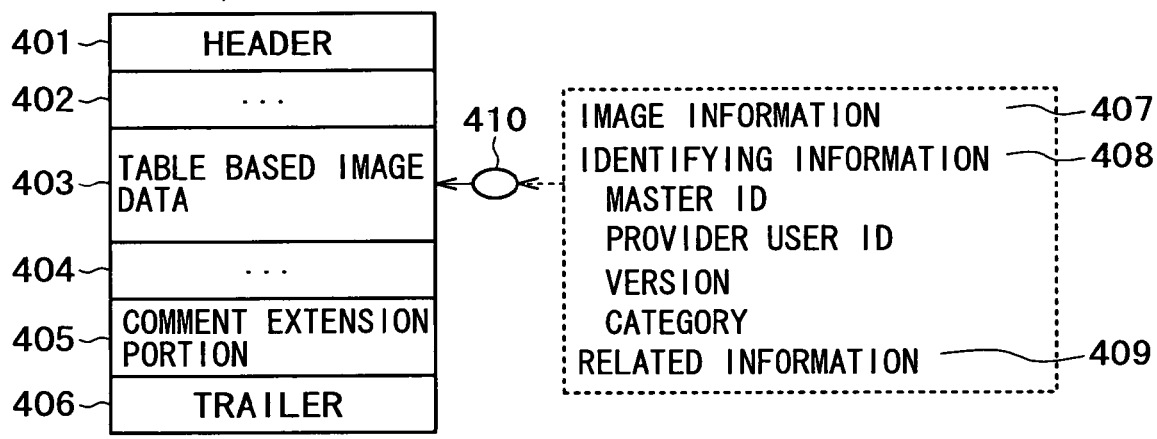
FIG. 4 is a diagram illustrating master information image data 400.

Another format for embedding in image information will next be described with reference to FIG. 4. FIG. 4 is a diagram illustrating master information image data 400 as another format of a master information image having related information embedded therein.

Also in this case, an image in a GIF format is taken as an example of image information. It is to be noted that also in this example, instead of the GIF format, a JPG format, a PCX format, or the like may be employed as the format.

As with the above, a header 401 is a field provided to identify this information as image information in the GIF format. The header 401 is assigned a character string of "GIF" and a version thereof.

Table based image data 403 is a place for disposing image data in which pixels are arranged from a left to a right and from a top to a bottom. In this case, image information 407, identifying information 408 (master ID, provider user ID, version, and category), and related information 409 are mixed with each other in a form of a watermark. Thus, the image information 407, the identifying information 408, and the related information 409 are mixed 410 with each other such that whereas the related information cannot be visually recognized as it is, the image information can be visually recognized as it is. The information thus mixed 410 is coded by using an LZW algorithm for variable-length code.

A comment extension portion 405 includes text information that does not constitute graphic information in the GIF data stream. This field is not particularly required in the present example. However, if necessary, the information providing unit can use the field by free definition.

A trailer 406 indicates that the data stream is ended. The trailer 406 signifies that the trailer 406 is not followed by other parameter information or the like.

All these descriptions in this image example have also been made by taking the GIF format as an example; however, another image format may be used as long as the related information is thus recorded in an area separated from the image information.

(2.5.4. Format of Copy Information Image—2)

Figure 5:
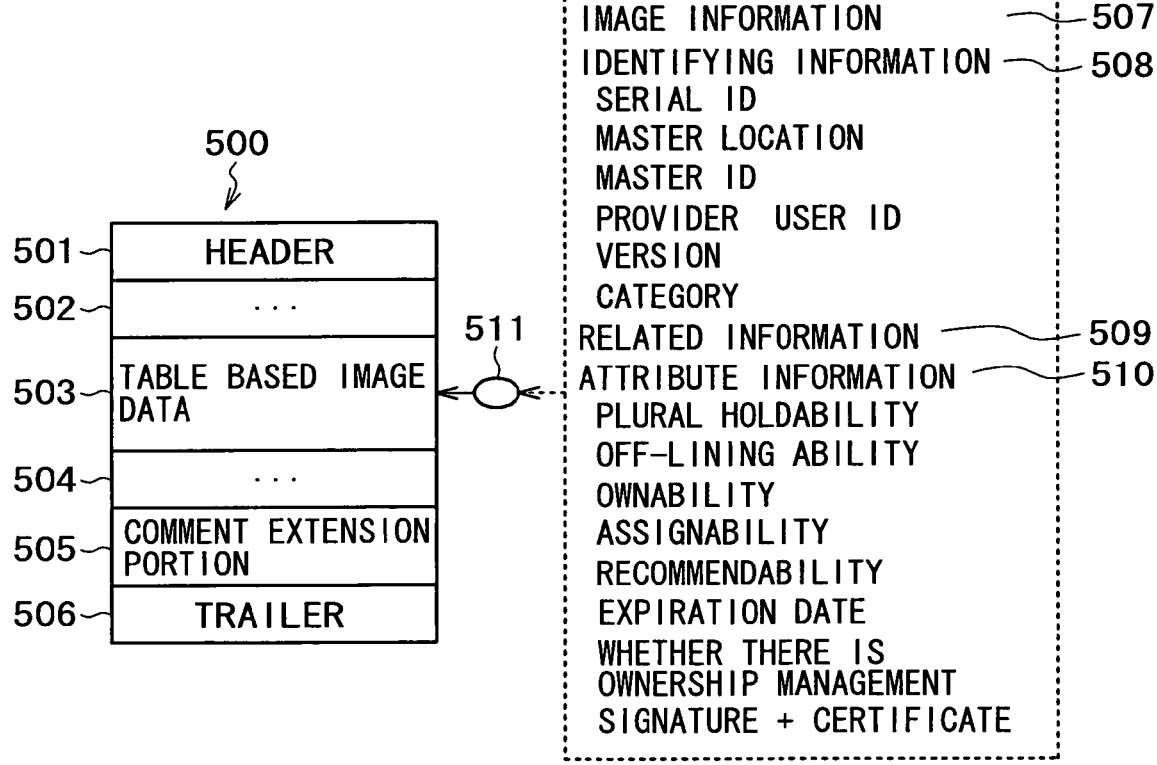
FIG. 5 is a diagram illustrating copy information image data 500.

FIG. 5 is a diagram illustrating copy information image data 500 as a format of a copy information image having related information, identifying information, and attribute information embedded therein.

The format of the copy information image shown in FIG. 5 is similar to the format of the master information image shown in FIG. 4. Table based image data 503 is a place for disposing image data in which pixels are arranged from a left to a right and from a top to a bottom. In the case of the copy information image, attribute information 510 (plural holdability, off-lining ability, ownability, assignability, expiration date, whether there is ownership management, signature, and certificate) is also mixed in a form of a watermark together with image information 507, identifying information 508 (serial ID, version, category, master ID, master location, provider user ID, and the like), and related information 509. Thus, the image information 507, the identifying information 508, the related information 509, and the attribute information 510 are mixed 511 with each other such that whereas the related information cannot be visually recognized as it is, the image information can be visually recognized as it is. The information thus mixed 511 is coded by using an LZW algorithm for variable-length code.

(2.6. Example of Data Structure of Information Image Realized by XML Data)

The information image data described with reference to FIGS. 2 to 5 can be realized by XML (EXTENSIBLE MARKUP LANGUAGE) data. XML is a markup language characterized in that tags can be defined originally. An information image can be realized by XML data in which data related to identifying information, related information, attribute information, and image information is embedded in tags.

FIG. 6 is a diagram illustrating an example of data structure of an information image realized by XML data.

Descriptions 601 to 603 are related to identifying information of the copy information image. The description 601 indicates a serial ID; the description 602 indicates a version; and the description 603 indicates a category.

Descriptions 604 to 606 are related to attribute information of the copy information image. The description 604 indicates ownability; the description 605 indicates off-lining ability; and the description 606 indicates recommendability.

A description 607 and a description 608 are related to related information of the copy information image. The description 607 indicates a link to a home page and the like and thereby allows access to the home page. The description 608 indicates a location and the like from which a music content is obtained, and thereby enables reproduction of the music content.

(3. Databases Managed by Servers)

(3.1. Database Managed by User Managing Server 101)

Figures 7, 8:
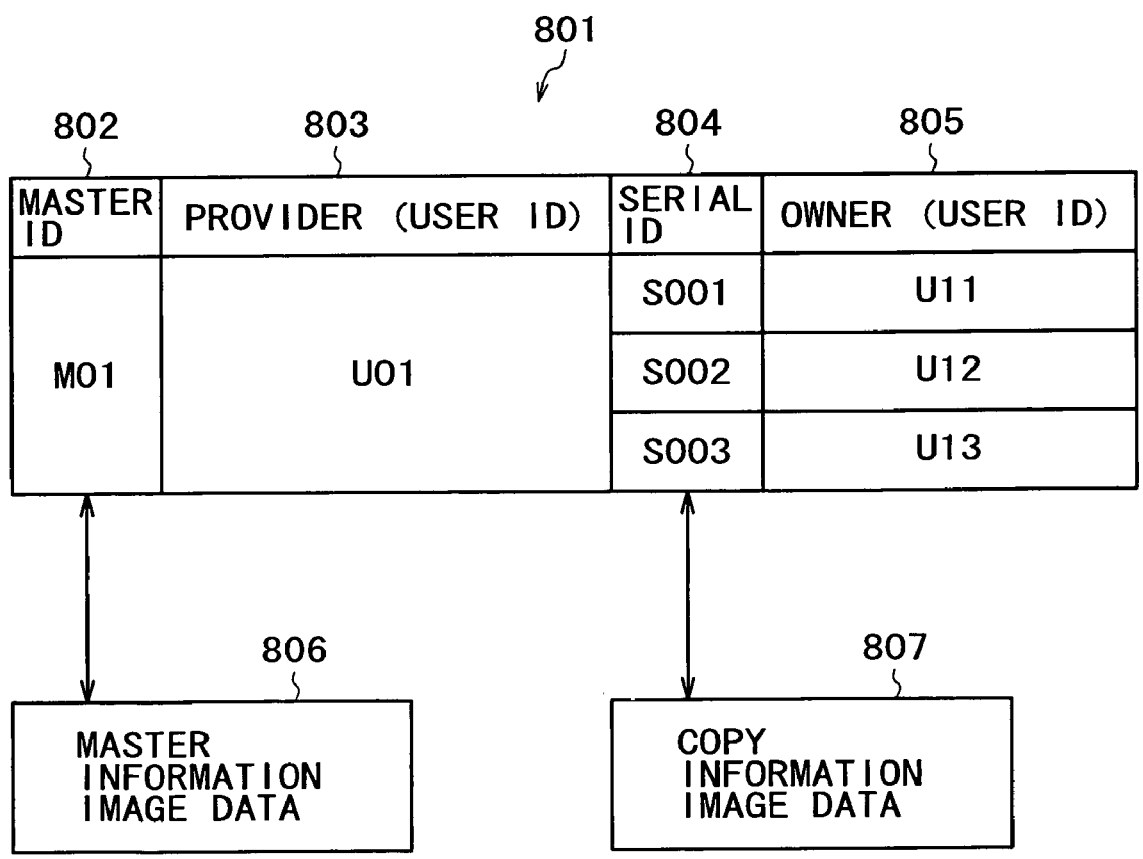
FIG. 7 is a diagram showing an example of structure of a user managing table 701 retained and managed by a user managing unit 111 of a user managing server 101.
FIG. 8 is a diagram showing an information image managing table 801 retained and managed by an information image managing unit 112 of an information image managing server 102.

FIG. 7 is a diagram showing an example of structure of a database retained and managed by the user managing unit 111 of the user managing server 101. The user managing unit 111 retains and manages information related to users as a database. The structure of the database is not limited to this example, and may be any structure as long as the database allows user authentication and the like.

In the example shown in FIG. 7, the user managing unit 111 retains a user managing table 701. By referring to the user managing table 701, a user accessing the information image utilizing system 100 can be authenticated.

The user managing table 701 has a user ID 702, a password 703, a user attribute 704, a folder managing server location 705, an information image managing server location 706, and the like. The user ID 702 is a code string including symbols, numbers, characters, and the like for identifying a user of the information image utilizing system 100. The password 703 is a code string including symbols, numbers, characters, and the like used for authenticating the user. The user attribute 704 indicates attributes of the user, such for example as a name, an address, and a user category (ordinary member, special member, or the like).

The folder managing server location 705 is a location (position information on the network, IP [Internet Protocol] address, URL [Uniform Resource Locator], or the like) of the folder managing server having a folder managing table (folder) corresponding to the user ID 702. The information image managing server location 706 is a location of the information image managing server corresponding to the user ID 702.

The folder managing server location 705 is mainly referred to when the user uses the information image utilizing system 100 as the operator of the client 105. The information image managing server location 706 is mainly referred to when the user uses the information image utilizing system 100 as a provider of the information image providing server 104.

(3.2. Database Managed by Information Image Managing Server 102)

The information image managing server 102 retains and manages the master information image data and the copy information image data described with reference to FIGS. 2 to 5. Also, the information image managing server 102 manages the master information image and a provider of the master information image in association with each other. The server 102 manages the copy information image and an owner of the copy information image in association with each other.

FIG. 8 is a diagram showing an information image managing table 801 retained and managed by the information image managing unit 112 of the information image managing server 102. The structure of the database is not limited to this, and may be any structure as long as information image data, an information image providing unit, and an information image owner are associated with each other.

The information image managing table 801 retains and manages a master ID 802, a provider 803, a serial ID 804, and an owner 805 in association with each other. The master ID 802 is a code string including numbers, characters, symbols, and the like for identifying a master information image. The provider 803 is a user ID of a provider of the master information image. The serial ID 804 is a code string including numbers, characters, symbols, and the like for identifying a copy information image. The owner 805 is a user ID of an owner of the copy information image. Incidentally, the "owner" is a user who has registered the copy information image in a folder of the user on the folder managing server 103.

The master ID 802 and a master ID of identifying information included in master information image data 806 are brought into relation to each other. The serial ID 804 and a serial ID of identifying information included in copy information image data 807 are brought into relation to each other. Incidentally, the master information image data 806 corresponds to the master information image data 200 and the master information image data 400 shown in FIG. 2 and FIG. 4. The copy information image data 807 corresponds to the copy information image data 300 and the copy information image data 500 shown in FIG. 3 and FIG. 5.

The information image managing server 102 can change contents of the master information image data related to the information image providing server 104 in the information image managing table 801 on the basis of an instruction from the information image providing server 104, add attribute information to the master information image data to generate the copy information image data, grasp the owner of the copy information image, and change the attribute information of the copy information image data for each owner.

(3.3. Database Managed by Folder Managing Server 103)

The folder managing server 103 has the folder managing unit 113. The folder managing unit 113 manages a folder retaining information disclosed for each user.

That is, a user (an operator of a client or the like) has a folder exclusively for the user on the folder managing server 103. The operator registers a copy information image in the folder of the operator to thereby own the copy information image.

Incidentally, to own the copy information image, it is not necessary to record the copy information image data itself in the folder. It suffices to at least record a serial ID of the copy information image. In this case, when there is a request to provide the owned information image from the client of the operator, the folder managing server 103 requests the copy information image data from the information image managing server 102 on the basis of the serial ID recorded in the folder of the operator, whereby the copy information image data can be provided to the client.

FIG. 9 is a diagram showing a folder managing table 901 retained and managed by the folder managing unit 113 of the folder managing server 103. It is to be noted that a structure of the database is not limited to this, and may be any structure as long as the database associates a user such as an operator or the like and a copy information image with each other.

The folder managing table 901 associates a user ID 902 and a master ID or serial ID 903 with each other. The user ID 902 is a user ID of the operator or the like. The master ID or serial ID 903 is to record a serial ID of a copy information image owned by the user identified by the user ID 902 or a master ID of a master information image related to the user. Incidentally, for technical, convenience, or other reasons, attribute information of the copy information image, other information image data, and the like may also be recorded in the folder managing table 901 as required.

(3.4. Decentralization of Servers)

The information image managing server 102 and the folder managing server 103 can be disposed in a decentralized manner to distribute loads on the information image utilizing system.

For the decentralization of these servers, when the user managing server 101, the information image managing server 102, the folder managing server 103, and the information image providing server 104 access each other, an access destination and an access source may be recorded. Alternatively, locations corresponding to each user (positions on the network, IP [Internet Protocol] addresses, or URLs [Uniform Resource Locators]) of the information image providing server 102, the folder managing server 103, and the information image providing server 104 may be recorded in the user managing table 701. Further, the locations of these servers may be recorded in an information image.

In this case, the information image providing server 104 and the client 105 can access the corresponding information image managing server 102 and the corresponding folder managing server 103. Further, as described with reference to FIG. 2 and FIG. 4, information image data includes a provider user ID as identifying information, so that the folder managing server 103 can access the information image managing server 102 and the like corresponding to the provider user ID.

(4. Outline of Operation of Information Image Utilizing System)

Figure 10:
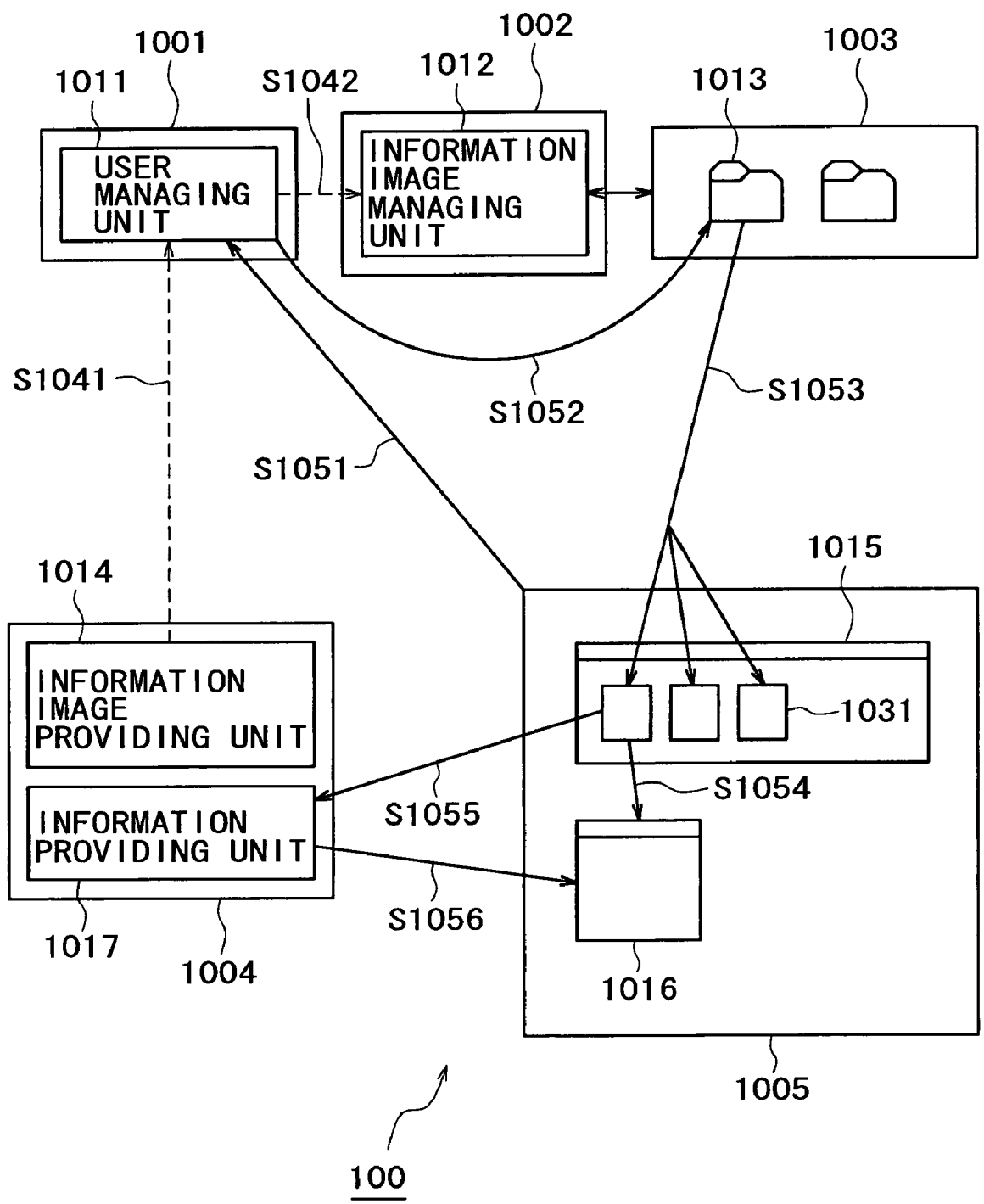
FIG. 10 is a diagram showing an outline of operation of the information image utilizing system 100.

An outline of operation of the information image utilizing system will be described with reference to FIG. 10. FIG. 10 is a diagram showing an outline of operation of the information image utilizing system 100.

(4.1. Operation of Information Image Utilizing System Related to Information Image Providing Server)

An information image providing server 1004 accesses a user managing server 1001 to be authenticated (S1041). An information image providing unit 1014 of the information image providing server 1004 supplies an information image managing server 1002 with an instruction to register a master information image, an instruction to generate a copy information image, an instruction to change attribute information of a copy information image, a request to provide a state of ownership of a copy information image, and the like (S1042). An information image managing unit 1012 of the information image managing server 1002 registers the master information image, generates the copy information image, changes the attribute information of the copy information image, and provides the state of ownership of the copy information image.

(4.2. Operation of Information Image Utilizing System Related to Client)

A client 1005 accesses the user managing server 1001 to be authenticated (S1051). A folder managing server 1003 transmits copy information image data registered in a folder 1013 of an operator of the client 1005, that is, owned by the operator to the client 1005 (S1053).

Incidentally, when the folder managing server 1003 transmits the copy information image data, the copy information image data may be provided from the information image managing unit 1012 of the information image managing server 1002 on the basis of a serial ID recorded in the folder 1013. The client 1005 displays the copy information images on an information image manipulating unit 1015.

When the operator performs a predetermined manipulation on a copy information image 1031, the client 1005 displays a content of related information included in the copy information image on a browser unit 1016 (S1054) or requests provision of information from an information providing unit 1017 of the information image providing server 1004 on the basis of a destination for obtaining related information included in the copy information image (S1055). After the information providing unit 1017 transmits the information to the client 1005 in response to the request (S1056), the client 1005 displays the information on the browser unit 1016.

(4.3. Synchronization between Information Image Providing Server and Folder Managing Server)

Data contents retained by the information image managing unit 1012 and data contents retained by the folder 1013 are synchronized with each other in predetermined timing to maintain consistency.

(5. Content Information Image)

FIG. 11 is an extraction of a part of FIG. 10 and concretely shows a content information image. The content information image has a function of distributing content information such as music, video, a game, and the like. The content information image according to the present embodiment includes image information related to the content, identifying information for identifying the content information image, and attribute information for management by the information image providing unit (a retaining condition and a time limit condition can be set).

(5.1. Use of Content Information Image)

A case where the client 1005 uses a content information image of a "○○○ new song" will be described concretely with reference to FIG. 11. The client 1005 displays the content information images owned by the client 1005 on the information image manipulating unit 1015.

Figure 14:
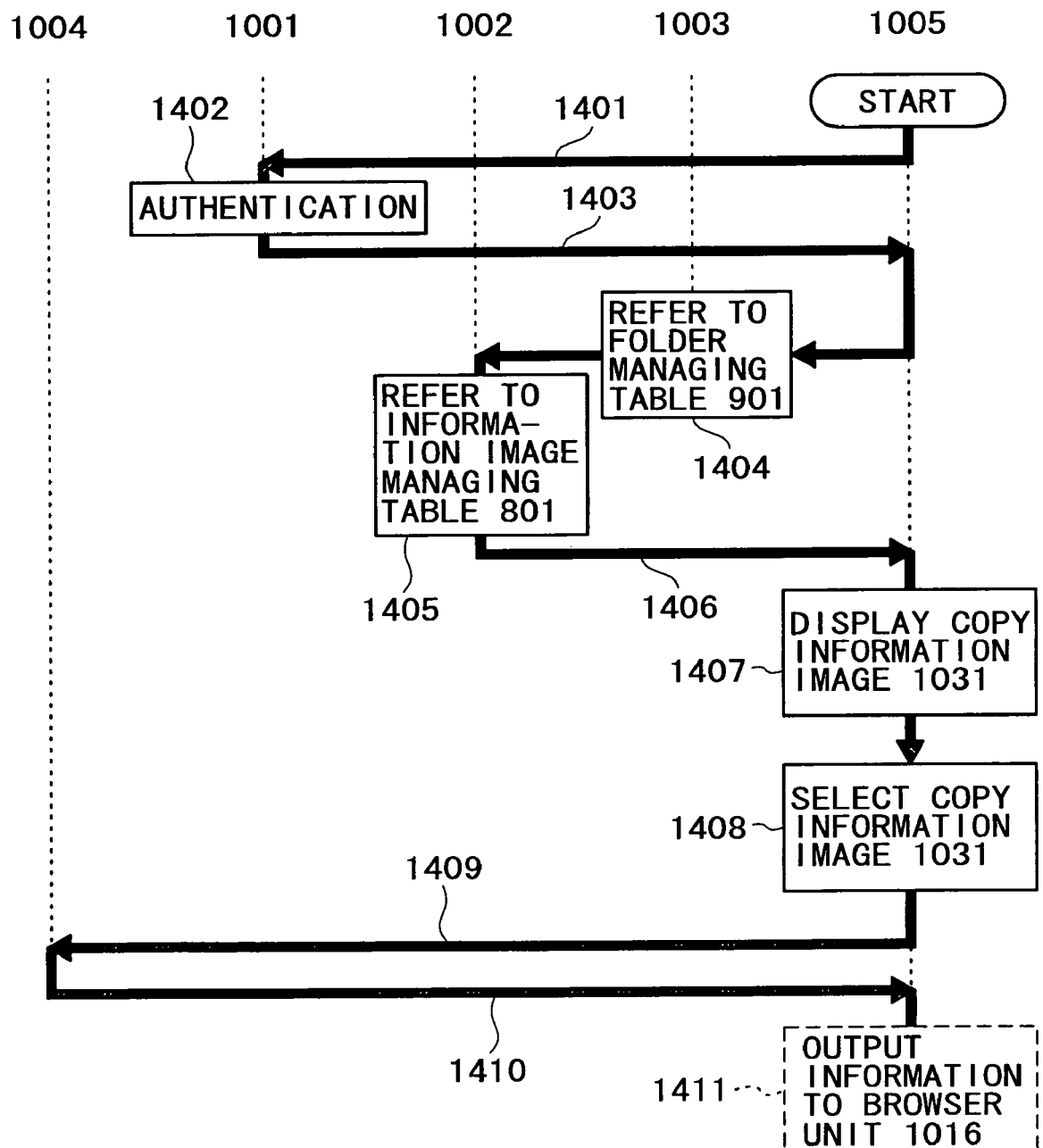
FIG. 14 is a flowchart of a procedure in which an information image is outputted to a browser unit 1016.

The copy information images 1101 of a plurality of musical artists are displayed on the information image manipulating unit 1015 in FIG. 11. That is, pictures, illustrations, or the like related to the content information images are displayed. Incidentally, a procedure and an operation of the information image utilizing system 100 when the client 1005 logs in to the information image utilizing system 100 according to the present embodiment and displays a copy information image 1101 on the information image manipulating unit 1015 will be described later in detail (FIG. 14).

The client 1005 selects a copy information image 1101 including a content of the "○○○ new song" and then clicks a "song reproduction" button displayed on the information image manipulating unit 1015. The button is not shown in FIG. 11. Alternatively, the client 1005 selects the copy information image 1101 including the content of the "○○○ new song," and when a mouse is right-clicked, the client 1005 opens another window below the copy information image 1101 to display a menu of "song reproduction, profile display, lyric display . . . " to allow selection of an action. A method of displaying the menu and a method of the selection may be any method.

The client 1005 requests the "reproduction" of the content of the "○○○ new song." For example, in a case where there is a small amount of reproduction information data and all is included as the related information 308 of the copy information image data 300, the client 1005 directly starts the browser unit 1016 and performs the "reproduction" of the content of the "○○○ new song." That is, the content can be used with only the copy information image 1101 downloaded to the information image manipulating unit 1015 without the trouble of connecting to the network 121.

Alternatively, the client 1005 refers to the "master location" and the "master ID" of the identifying information 307 of the copy information image data 300 and accesses the information image providing server 1004. After downloading the content of the "○○○ new song" from the information providing unit 1017 or by streaming, the client 1005 performs the "reproduction" of the content of the "○○○ new song" using the browser unit 1016.

Incidentally, in a case where an expiration date of the content information image of the "○○○ new song" has passed (set in the attribute information 309), when the client 1005 logs in and displays the information image on the information image manipulating unit 1015, a message to the effect that the expiration date has passed is displayed. Also, in a case where a content information image is updated by the information image providing unit at a time of log-in, whether the content information image is to be updated is displayed on the information terminal apparatus of the client 1005.

Incidentally, in the above description, the attribute information 309 such as the expiration date and the like and the update (version) or the like are notified when the client 1005 logs in to the information image utilizing system 100; however, when a content information image is selected to be used, the identifying information 307 or the attribute information 309 of the copy information image 1101 of the content may be updated, without the notification at the time of log-in.

(5.2. Registration of Content Information Image by Information Providing Unit)

Figure 12:
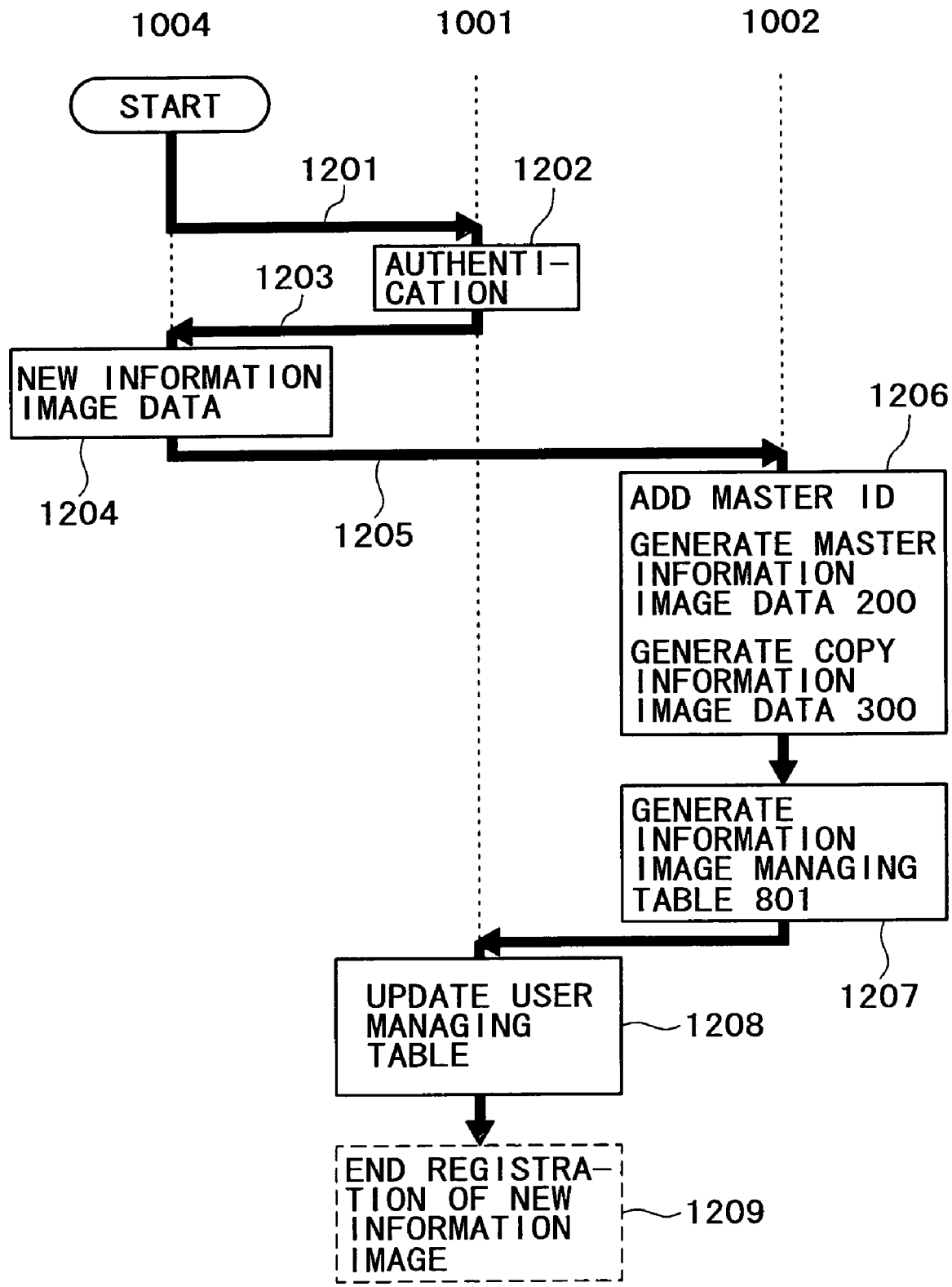
FIG. 12 is a flowchart of a procedure in which an information image providing unit registers a new information image.

A procedure in which an information image providing unit registers a content information image is represented by a flowchart of FIG. 12. Description will be made in conjunction with FIG. 10 showing the system configuration and FIG. 2, FIG. 3, and FIG. 8 showing the data structures.

The information image providing server 1004 accesses the user managing server 1001 (step 1201) and inputs a user (provider) ID and a password or the like to be authenticated (step 1202). After being authenticated (step 1203), the information image server 1004 generates new content information image data to provide the information (step 1204) and then sends the content information image data to the information image managing server 1002 (step 1205). The content information image data includes "image information" representing the content and related information 208. As described above, the related information 208 is information (URL, IP address, or the like) identifying the information. When a specific program is desired to be operated, the related information 208 may be a name of the program or the program itself.

At a step 1206, the information image managing server 1002

(1) adds a master ID to the content information image data;
(2) generates master information image data 200 on the basis of the content information image data by adding identifying information 207 including the master ID, the provider user ID, a version, a category, and the like; and
(3) generates copy information image data 300 by adding attribute information 309 to the master information image data 200. Incidentally, the copy information image data 300 includes a different serial ID of identifying information 307 and different attribute information 309 for each client 1005 owning the content information image. That is, even with the same content information image (that is, the same master ID), the expiration date of the content information image can be set differently (that is, the attribute information 309 is different) for each client (different serial ID), for example, by specification by the information image providing unit.

Next, the information image managing server 1002 generates an information image managing table 801 as shown in FIG. 8 (step 1207). The master information image data 806 is associated with the master ID 802. When the information image is newly generated, a data table for a serial ID 804 and an owner 805 is blank. When the information image is owned by a user, the owner 805 (user ID) of the copy information image data 807 having a serial ID 804 is recorded in association with the serial ID 804. That is, the information image providing unit can grasp the user owning the content information image and can manage the content information image minutely by setting the attribute information for each user. For example, the information image providing unit can set the expiration date of the content information image differently for each user. Further, the information image providing unit can make settings to prohibit the content information image from being retained in a plurality of folders, disallows the information image to be made offline (prohibits the information image from being extracted from the information terminal of the user), and the like.

Then the user managing server 1001 updates the user managing table 701 (FIG. 7). Specifically, the user managing server 1001 updates the user attribute 704 related to the information image providing unit as a user (when the master ID of the new information image is added, for example) (step 1208). After the above-described procedure, the processing for registering a new information image is ended (step 1209).

(5.3. Update of Content Information Image and Change of Attribute Information by Information Providing Unit)

Figure 13:
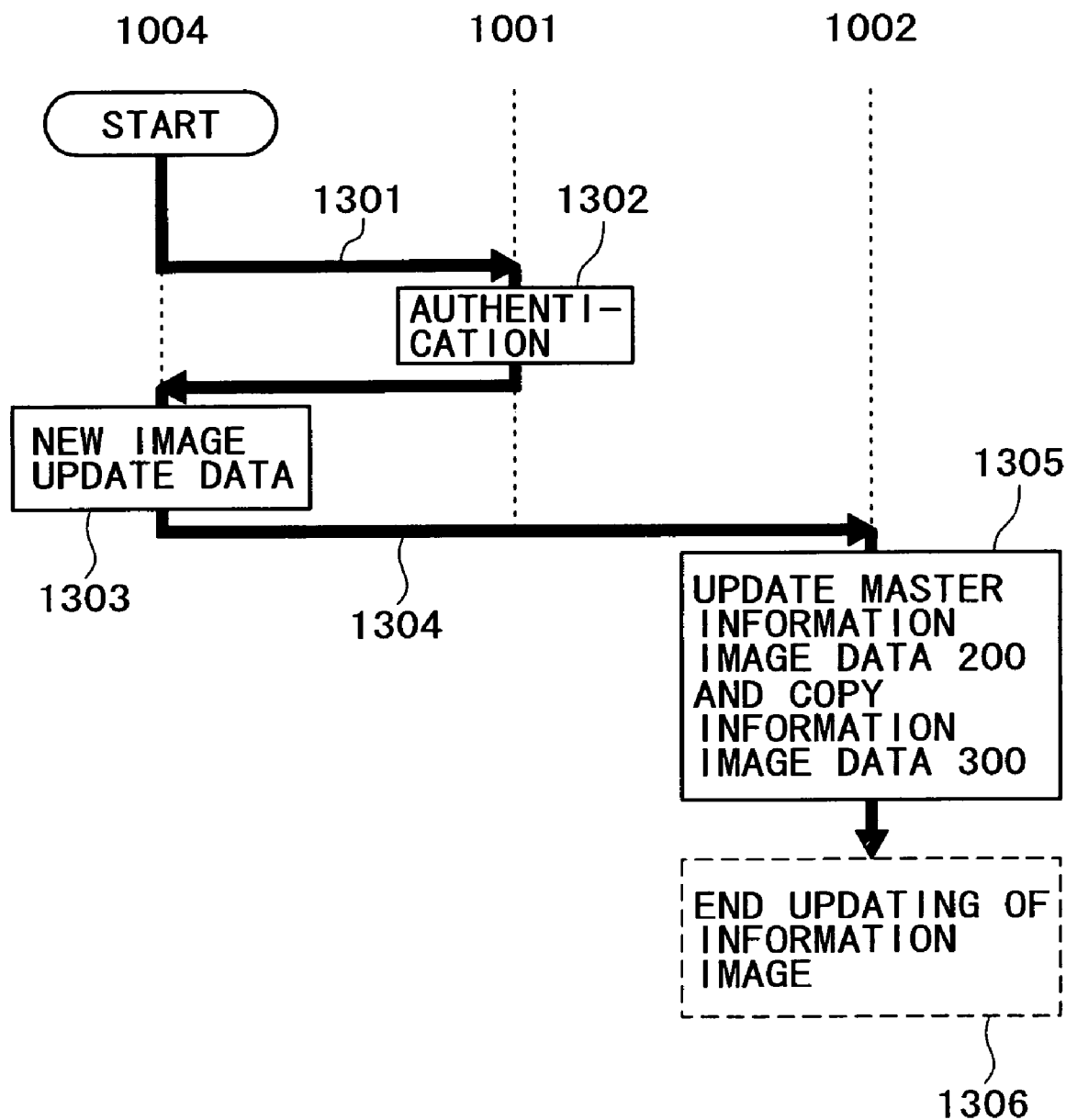
FIG. 13 is a flowchart of a procedure in which the information image providing unit updates the information image.

A procedure in which the information image providing unit updates the content of the content information image is represented by a flowchart of FIG. 13. Incidentally, a procedure for changing the attribute information is the same and will therefore be described in parallel. The setting and changing of the attribute information can be performed for each owner of the content information image and is a feature most closely related to authentication and setting of an access right of a user, which characterize the present embodiment. Description will be made in conjunction with FIG. 10 showing the system configuration and FIG. 2, FIG. 3, and FIG. 8 showing the data structures. Incidentally, rights to update, change, delete, or the like the content information image and the attribute information are limited to the provider of the content information image in principle.

The information image providing server 1004 accesses the user managing server 1001 (step 1301) and inputs a user (provider) ID and a password or the like to be authenticated (step 1302). After being authenticated, the information image server 1004 generates content information image update data (step 1303) and then sends the content information image update data to the information image managing server 1002 (step 1304).

Incidentally, the attribute information 309 is updated by a similar procedure. Specifically, the client 1005 owning the content information image is specified, and the expiration date of the content information image is changed or a setting is made to indicate that the content information image cannot be owned.

Next, using the update data sent from the information image providing server 1004, the information image managing server 1002 updates the master information image data 200 and updates the copy information image data 300 (step 1305). The information image and the related information 208 of the master image data 200 are updated, and the version of the identifying information 207 is updated. Similarly, the information image and the related information 308 of the copy information image data 300 are updated, and the version of the identifying information 307 is updated.

Incidentally, the update may be performed automatically without consent of the client 1005, or the client 1005 may be able to use the updated new information image only after the client 1005 consents to the update. In the latter case, the client 1005 knows the data update by comparing the version of the content information image when logging in to the information image utilizing system 100 or when accessing the content information image. The client 1005 can use the updated content information image after consenting to the data update and performing update processing.

The case of changing the attribute information will be described by taking two examples of (1) changing the attribute information to indicate that the information image cannot be owned and (2) changing the attribute information to indicate that the information image can be assigned, for example.

(1) The case of changing the attribute information to indicate that the information image cannot be owned, that is, the case of disallowing use of the information image by a specific client 1005. At the step 1305, the information image managing server 1002 changes a flag for indicating the ownability in the attribute information 309 to indicate that "the information image cannot be owned." When the client 1005 accesses the information image utilizing system 100 to use the content information image, a message reading "This content is no longer available," for example, is displayed, and the content cannot be used. At the same time, the corresponding serial ID 804 in the information image managing table 801 of the information image managing server 1002 and the copy information image data 807 corresponding to this information image are deleted, and also the corresponding serial ID 903 of the content information image in the folder managing server 1003 is deleted. Further, depending on settings, a cache of the content information image recorded at the client 1005 is deleted at the same time.

(2) In the case of changing the attribute information to indicate that the information image can be assigned, at the step 1305, a flag for indicating assignability in the attribute information 309 is changed to indicate that "the information image can be assigned." When the client 1005 accesses the information image utilizing system 100 and selects the content information image, a message reading "This content is now assignable," for example, is displayed. Alternatively, an "assign" button of an information image manipulating menu becomes operable.

After the above-described procedure, the operation for the update of the information image or the change of the attribute information is ended (step 1306).

(5.4. Use of Content Information Image and Operation of Information Image Utilizing System)

A procedure in which the client 1005 uses a content information image is represented by a flowchart of FIG. 14. Description will be made in conjunction with FIG. 10 and FIG. 11 showing the system configuration and FIG. 2, FIG. 3, and FIG. 8 showing the data structures.

A procedure in which the client 1005 uses the content information image of the "○○○ new song" and listens to the new song on the computer, for example, will be described.

The client 1005 accesses the information image utilizing system 100 from the computer (step 1401). The client 1005 connects to the user managing server 1001 and inputs a user ID 702 and a password 703 to be authenticated (step 1402). The client 1005 obtains a right to access the information image utilizing system 100 (step 1403). The client 1005 accesses the folder managing server 1003 specified in the folder managing server location 705 information in the user managing table 701 (FIG. 7) and then refers to the folder managing table 901 (FIG. 9) (step 1404).

In the folder managing table 901, the user ID 902 (that is, the ID of the client) and the serial ID 903 of the content information image registered by the client 1005 are associated with each other. After referring to the folder managing table 901, the client 1005 is further connected to the information image managing server 1002.

The client 1005 refers to the information image managing table 801 (FIG. 8) the information image managing server 1002 (step 1405). The copy information image data 807 (FIG. 8) of the content information image registered by the client 1005 is downloaded to the information image manipulating unit 1015 (FIG. 11) of the client 1005 (step 1406). Thus, a plurality of copy information images are displayed on the information image manipulating unit 1015 (step 1407).

Incidentally, when the content information image owned by the client 1005 is updated or deleted, or the attribute information 309 (ownership information and the like) is changed, the identifying information 307 or the attribute information 309 of the copy information image data 807 (copy information image data 800 in FIG. 3) is changed, and therefore a procedure for displaying and consenting to the update, the deletion, or the change of the attribute information 309 (ownership information and the like) is added to the client 1005.

The client 1005 selects the copy information image 1031 of the "○○○ new song" (copy information image 1101 in FIG. 11) (step 1408). Though not shown, a pull-down menu or a plurality of buttons are displayed on a screen to allow selection of an action such for example as "view and listen," "reproduce of all music pieces," "reproduce and lyric display," "attach to email," "offline," "assign," "delete" . . . This action menu is displayed differently for each content information image or for each type of information image.

The client 1005 selects the action of "reproduce of all music pieces" and then connects to the information providing server 1004 (step 1409). The "○○○ new song" is provided from the information image providing unit 1014 (step 1410). The client 5 can listen to the song using the browser unit 1016 (step 1411). Incidentally, information related to the browser utilized to use the content information image is included in the related information 308 (FIG. 3).

Incidentally, when for example the client 1005 selects "view and listen" and a content for "view and listen" is included in the downloaded copy information image 1031, the information downloaded to the information image manipulating unit 1015 of the client 1005 may be directly reproduced on the browser 1016.

(5.5. Forms of Content Information Image)

The content information image has different forms when distributed and owned. The forms of the content information image will be described with reference to FIG. 15 in parallel with a procedure in which the client 1005 obtains the distributed content information image and registers the content information image.

The content information image takes a form of an offline information image 1506 when distributed. Specifically, although the offline information image 1506 basically has the copy information image data 300 of FIG. 3, the offline information image 1506 does not have the serial ID of the identifying information 307. That is, this form indicates that the information image does not belong to any user.

The client 1005 can obtain the offline information image 1506 by various methods. There are methods of obtaining the offline information image 1506 (1) from a home page or the like; (2) attached to an email; (3) via a recording medium such as a flexible disk or the like; (4) from a poster on the street via a portable terminal; and the like.

(1) The case of obtaining the offline information image 1506 from a home page or the like (1501). The content information image put on various home pages to which the client 1005 is connected via the network is selected and downloaded to the information image manipulating unit 1015. The above-described information image managing server 1002 may have the function of disclosing the content information image provided from the information image providing unit. In this case, the client 1005 connects to the information image managing server 1002 to look for the content information image (without a serial ID because the content information image is in the offline form) desired to be obtained.

(2) The case of obtaining the offline information image 1506 attached to an email (1502). The client 1005 obtains the content information image attached to an email from a friend, a business, or the like. The attached content information image is obtained by specifying the information image manipulating unit 1015 as a destination for storing the content information image.

(3) The case of obtaining the offline information image 1506 via a recording medium such as a flexible disk or the like (1503). The content information image can be obtained via a recording medium such as a flexible disk, a CD-R, or the like.

(4) The case of obtaining the offline information image 1506 from a poster 1504 on the street via a portable terminal 1505. The client 1005 obtains the content information image data by putting the portable terminal 1505 such as a PDA (Personal Digital Assistants) or the like close to the content information image shown on the poster 1504. The client 1005 uses the content information image data on the portable terminal 1505. Alternatively, the content information image is used after being transferred to the computer.

Figure 15:
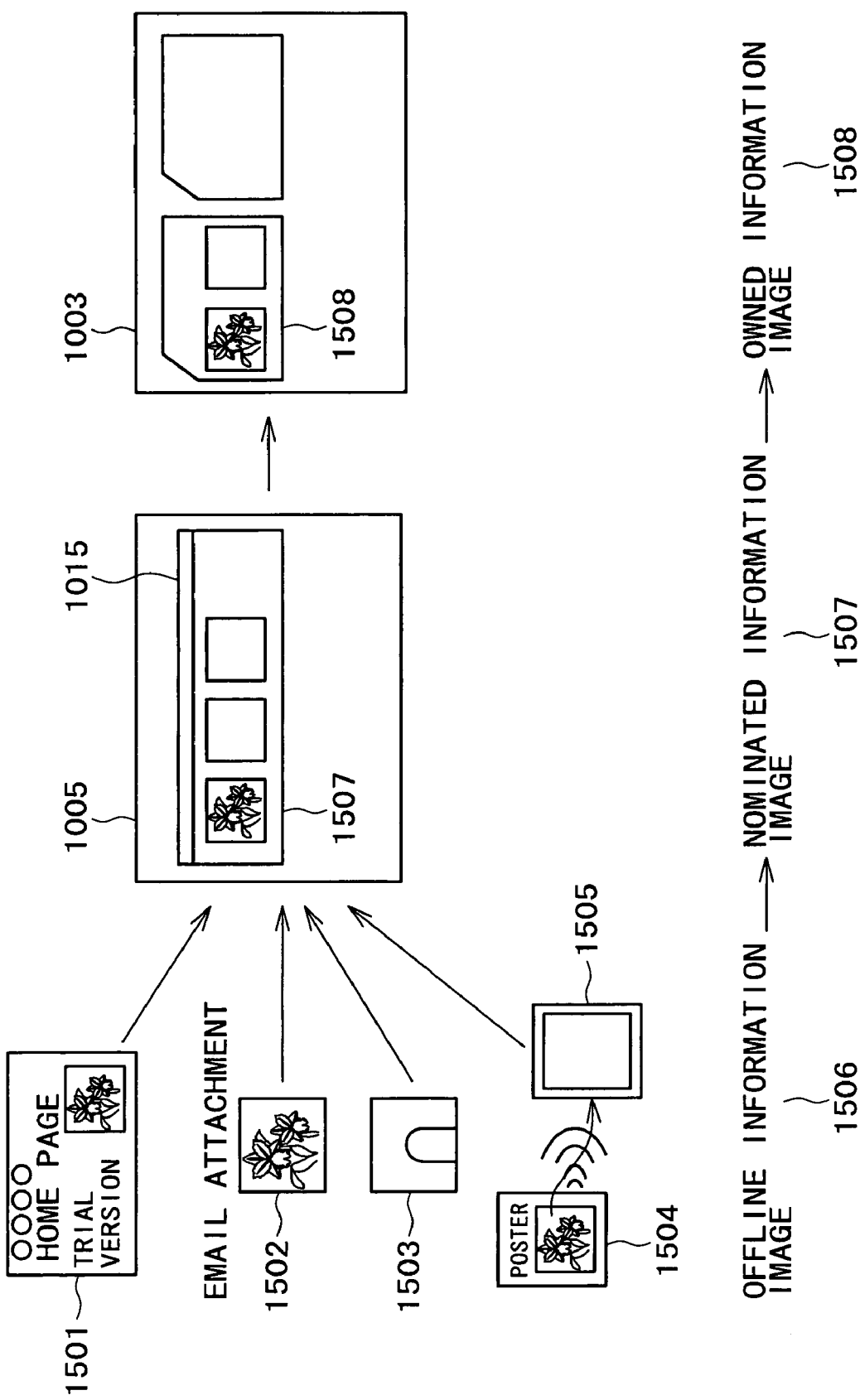
FIG. 15 is a diagram showing a process of owning an offline information image 1506.

Incidentally, though not shown in FIG. 15, the content information image can be obtained by a method in which another user sends the content information image directly to the folder 1013 on the folder managing server 1003 shown in FIG. 10. Also in this case, the content information image has the data structure of the offline information image 1506 without a serial ID. However, the content information image includes a sender user ID, a message and the like. The assigning of a content information image via the folder 1013 will be described with reference to FIG. 17.

Next, these offline information images 1506 are displayed on the information image manipulating unit 1015. Although the data structure of the information images is not changed, the information images become "nominated information images 1507" in a sense that the information images are present in a cache region of the information manipulating unit. The nominated information images 1507 allow use of part of information thereof even when the user is not connected to the information image utilizing system 100.

For example, the user obtains the offline information image 1506 of a "trial version of ○○ game" from a promotional poster 1504 on the street and then displays the offline information image 1506 as a nominated information image 1507 on the information image manipulating unit 1015. When selecting the nominated information image 1507 of the "trial version of ○○ game" and selecting "execute" from an action menu displayed, the user can play a part of the game.

When an original version of the ○○ game is desired to be obtained, the client 1005 selects the nominated information image 1507 of the "trial version of ○○ game" and selects "purchase" from the action menu displayed. Regular image information of the "○○ game" is registered in the file 1013 belonging to the client 1005 in the folder managing server 1003. The procedure will be described in detail with reference to FIG. 16. The image information has a serial ID added thereto and is present as an "owned information image 1508" on the folder managing server 1003. That is, the owner is determined, the serial ID is added, and the information image present on the folder managing server 1003 is converted to the "owned information image 1508."

As described above, in the information image utilizing system 100, master information image data related to one content information image is unique, whereas copy information image data generated on the basis of the master information image data takes a plurality of forms depending on a state of distribution. However, a serial ID and copy information image data given the serial ID are in a one-to-one correspondence with each other.

(5.6. Obtainment and Registration of Content Information Image)

Figure 16:
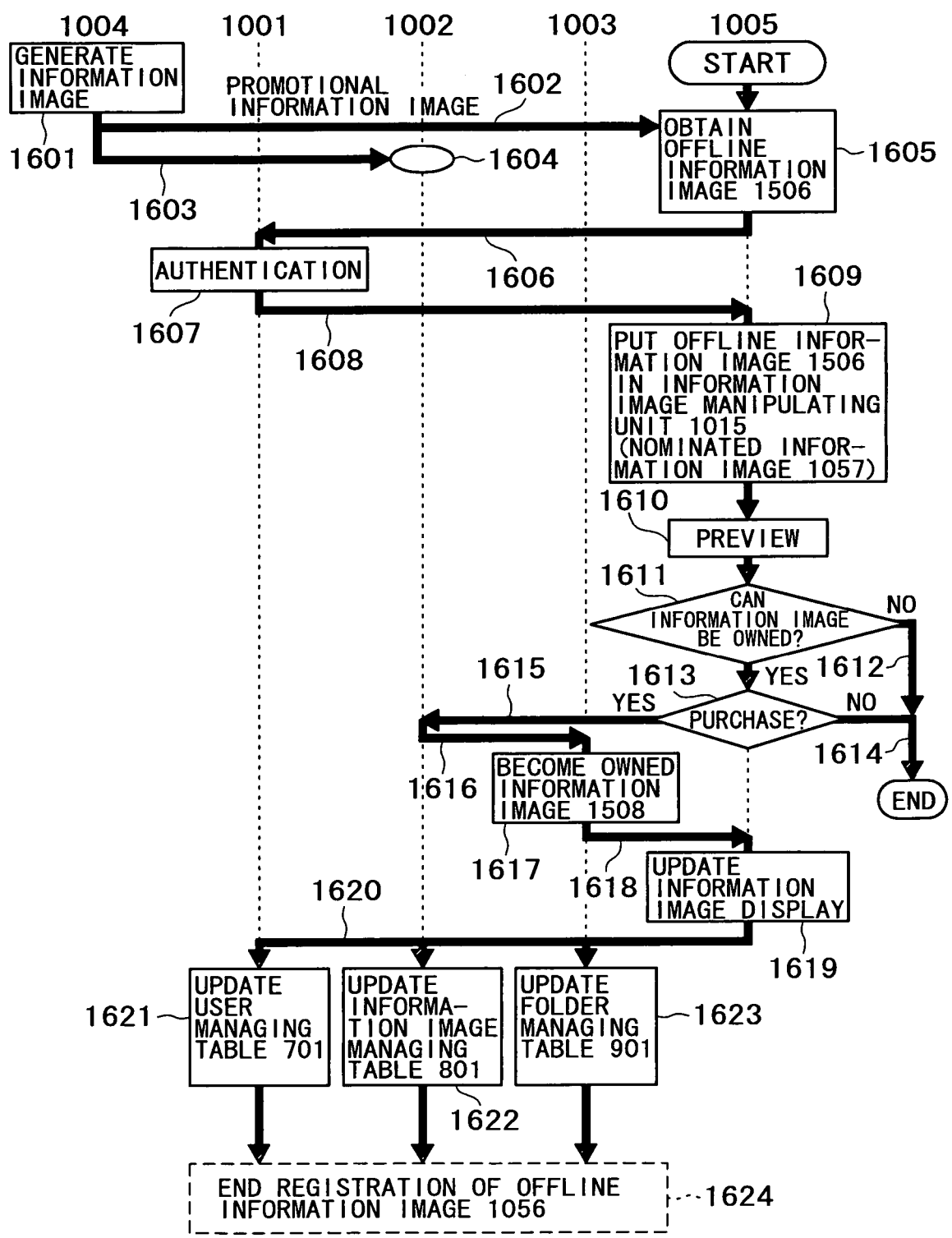
FIG. 16 is a flowchart of a process of owning an offline information image 1506.

A procedure in which the client 1005 obtains and registers a content information image is represented by a flowchart of FIG. 16. Description will be made in conjunction with FIG. 10 showing the system configuration, FIG. 2 and FIG. 3 showing the data structures, and FIG. 7, FIG. 8, and FIG. 9 showing the databases.

The information image providing server 1004 generates an information image (step 1601). The information image providing server 1004 accesses the information image managing server 1002 (step 1603) and then registers the data of the generated information image (step 1604).

That is, the image information managing table 801, the master information image data 806, and the copy information image data 807 shown in FIG. 8 are generated and registered. Details of the registration are represented by the flowchart of FIG. 12 and will therefore be omitted.

Also, the information image providing server 1004 generates a promotional information image (offline information image 1506 shown in FIG. 15) formed with reduced information of the registered full information image and provides the promotional information image to the client 1005 (step 1602). Incidentally, the registered full information image (offline information image 1506 without a serial ID) may be provided to the client 1005. The promotional information image has the same structure (without a serial ID, though) as the copy information image data 300 shown in FIG. 3. The information providing unit side sets items such as the expiration date, ownability, and the like in the attribute information 309, in particular, whereby ownership of the promotional information image can be limited.

The client 1005 obtains the content information image (that is, the offline information image 1506) (step 1605). The description of several methods for obtaining the content information image has been made with reference to FIG. 15 and will therefore be omitted.

The client 1005 logs in to the information image utilizing system 100 (step 1606) to be authenticated by the user managing server 1001 (step 1607).

The client 1005 captures the offline information image 1506 in the information image manipulating unit 1015 (step 1609). That is, the offline information image 1506 is converted to the form of a nominated information image 1507.

Next, when the client 1005 selects the content information image, a pull-down menu or a plurality of buttons are displayed to allow selection of an action such for example as "preview," "reproduce all music pieces," "purchase," "assign," "delete" . . . When "preview" is selected, the client 1005 previews the content information image having the form of the nominated information image 1507 (step 1610). Specifically, when the content information image represents a music content, it is possible to listen to the music content; when the content information image represents a video content, it is possible to view a part of the video; and when the content information image represents a game content, it is possible to experience a part of the game.

Incidentally, the content information image (nominated information image 1507) has the attribute information 309 (FIG. 3). When the attribute information 309 is set to indicate that the content information image cannot be owned (step 1611 and step 1612), the client 1005 cannot own the content information image. Also, if time limit information is set, the content information image cannot be reproduced after passage of a certain time period.

When the client 1005 purchases the content information image (YES at a step 1613), a "purchase" menu is selected, and the client 1005 is connected to the information image server 1002 (step 1615). The master information image data 200 is identified from a master location and a master ID of the content information image, and a serial ID is added to the corresponding copy information image data 300. Further, the serial ID is sent to the folder managing server 1003 for managing a file for each user. The folder managing server 1003 manages the content information image in the form of an owned information image 1508 having the serial ID (step 1617). Incidentally, the folder managing server 1003 may manage only the serial ID for identifying the content information image rather than the entity of the content information image. The server 1003 may manage the serial ID in conjunction with the identifying information and the attribute information of the content information image.

Next, the data of the content information image is downloaded from the folder managing server 1003 to the information image manipulating unit 1015 of the client 1005, and thus information image display on the client 1005 is updated (step 1619). That is, the content information image displayed on the client 1005 after the purchase has the serial ID. The content information image obtained after the purchase may have the same contents as the offline information image 1506 obtained first, or the content information image may be upgraded to include more contents.

The user managing server 1001 updates the user managing table 701 when necessary (step 1621). The information image managing server 1002 updates the information image managing table 801 (step 1622). That is, the new serial ID 804 is registered in association with the owner 805. The folder managing server 1003 updates the folder managing table 901 (step 1623). That is, the new serial ID 804 is registered in association with the owner.

After the above-described procedure, the registration of the offline information image 1506 is ended (step 1624). Incidentally, while description has been made of a case where the client 1005 "purchases" the content information image at the step 1613, the content information image may be registered free of charge. Also, though not shown, a billing server is provided for settlement of accounts for the content information image.

(5.7. Assigning of Content Information Image)

Figure 17:
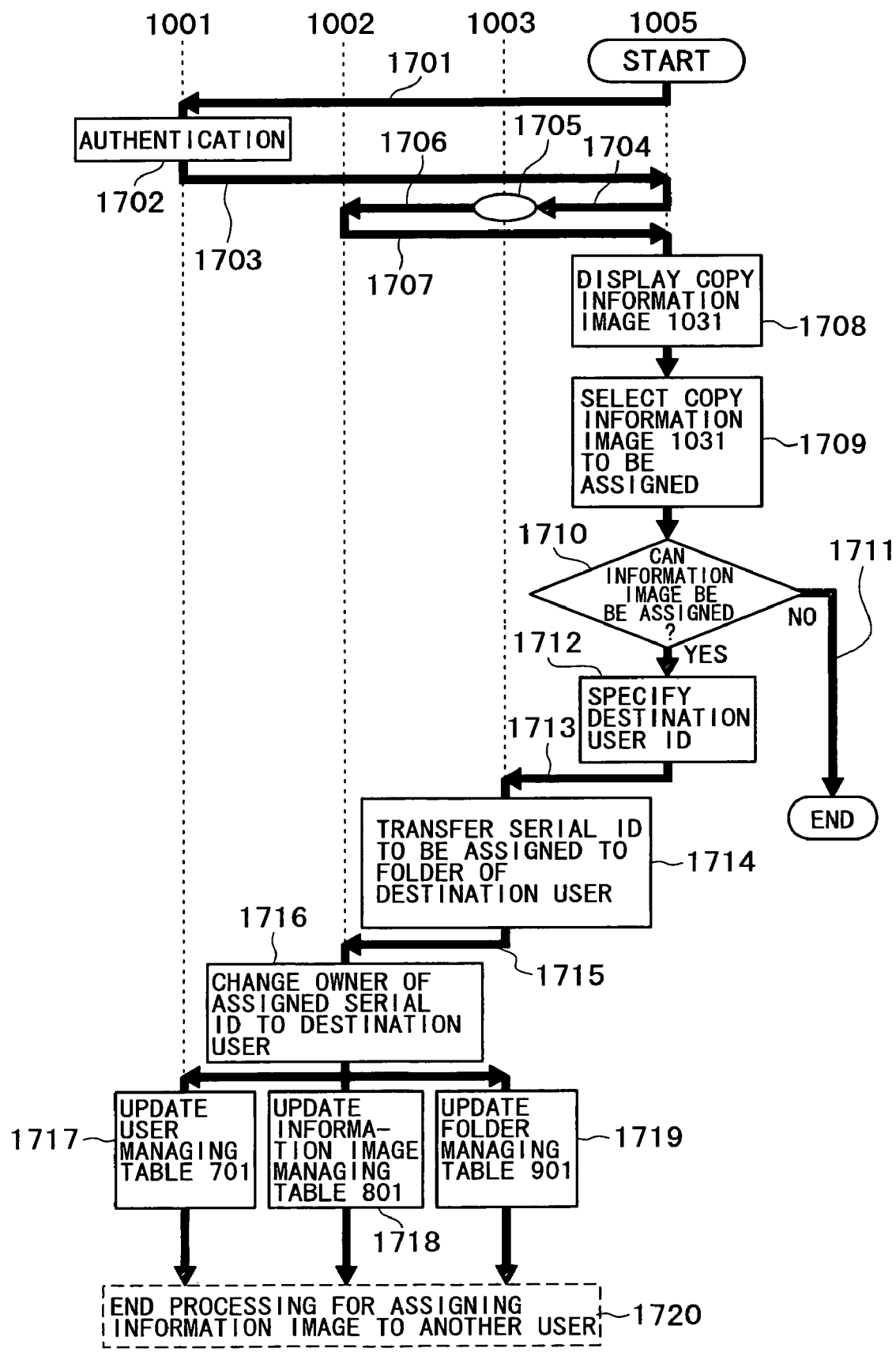
FIG. 17 is a flowchart of a process of assigning an information image.

A flowchart of FIG. 17 represents a procedure in which a content information image is assigned to another user. Description will be made in conjunction with FIG. 10 showing the system configuration, FIG. 2 and FIG. 3 showing the data structures, and FIG. 7, FIG. 8, and FIG. 9 showing the databases. Incidentally, "assign" means that an ownership right to a content information image owned by a user is assigned to another user, that is, a serial ID of the content information image is transferred to a folder owned by the other user.

A procedure in which the client 1005 assigns a content information image owned by the client 1005 to another user using the same information image utilizing system 100 will be shown. The client 1005 moves the content information image from the folder 1013 (FIG. 10) of the client 1005 in the folder managing server 1003 to the folder of the other user, thereby assigning the content information image.

The client 1005 logs in to the information image utilizing system 100 (step 1701). The client 1005 is authenticated by the user managing server 1001 (step 1702). The client 1005 accesses the folder managing server 1003 (step 1704) and refers to the folder managing table 901 (FIG. 9) (step 1705). The client 1005 traces an owned serial ID 903 and accesses the information image managing server 1002 (step 1706).

Then, the client 1005 downloads one or a plurality of pieces of copy information image data 300 having an owned serial ID 903 (step 1707). The client 1005 displays one or a plurality of copy information images 1031 on the information image manipulating unit 1015 (step 1708).

Incidentally, as described above, when versions of the information images recorded in the folder managing server 1003 and the information image server 1002 differ from each other, update processing and the like are performed. Also, when the attribute information 309 is changed, update processing is performed as described above.

Next, when the client 1005 selects the content information image (copy information image 31) to be assigned (step 1709), a pull-down menu of "reproduce," "assign," "offline", and the like is displayed. However, when the attribute information 309 of the content information image is set to indicate that the information image cannot be assigned (NO at a step 1710, and a step 1711), the "assign" in the menu cannot be selected.

The client 1005 selects the "assign" in the menu (step 1710) and specifies a destination user ID (step 1712). As a method of specifying the destination user, the user ID may be inputted, or the content information image may be dragged and dropped into an information image representing the user.

The folder managing server 1003 transfers the serial ID 903 of the content information image to be assigned to a folder of the destination user in the folder managing table 901 (step 1714). Further, the information image managing server 1002 changes (to the other user) the owner of the serial ID 804 who owns the content information image in the information image managing table 801 (step 1716). Though not shown, a history of change of ownership may be described in the copy information image data 300 of the content information image to be assigned.

The user managing server 1001 updates the user managing table 701 when necessary (step 1717). For example, when the folder managing server location 705 or the like is changed, the user managing server 1001 updates the user managing table 701. The information image managing server 1002 updates the information image managing table 801 (step 1718). The information image managing server 1002 also updates the copy information image data 807. The folder managing server 1003 updates the folder managing table 901 (step 1719).

By the above-described procedure, the client 1005 assigns the information image to the other user (step 1720). Incidentally, "recommend" rather than "assign" is possible when the attribute information 309 of the content information image is set to indicate that the information image can be retained in a plurality of folders. That is, the content information image is replicated and sent to another user. Further, when the content information image is allowed to be made offline, the content information image is made offline and recorded on a recording medium or attached to an email to be assigned or recommended to another user.

(6. Right to Access Content Information Image)

As described above, the entity of a content information image is retained in the information providing unit 1017 of the information image providing server 1004 or the information image managing unit 1012. Alternatively, when a volume of the content information image is small or the content information image does not require strict confidentiality and is desired to have high promotional capability, the entity of the content or part of the entity can be retained in the personal folder 1013 in the folder managing server 1003.

In either case, when the client 1005 is to use the content information image in the information image utilizing system 100 according to the present invention, the client 1005 does not directly access the entity of the content. The client 1005 first connects to the folder managing server 1003 for managing a folder 1013 for each client 1005. The user ID 902 of the client 1005 and the serial ID 903 of the information image are checked. Further, the client 1005 connects to the information image managing server 1002 to refer to the identifying information 307 and the attribute information 309 of the content information image.

The version is checked in the identifying information 307. If the client 1005 does not consent to an update, the client 1005 cannot use the content information image. Various settings (ownership condition, time limit information, and the like) are made in the attribute information 309 by the information image providing unit. When the settings are changed, the client 1005 must conform to the settings to use the content information image.

Thus, the client 1005 can obtain a right to access the content information image only when satisfying the identifying information 307 and the attribute information 309. Thus, the present embodiment has an effect of preventing use of the content information image illegally obtained or replicated.

Conversely, the information image providing unit can manage distribution of the content information image by setting the attribute information 309 included in the copy information image data 300.

Specifically, the content information image providing unit can specify a period of time during which the content information image can be accessed by setting the "expiration date" of the attribute information 309. In addition, the present embodiment allows a different setting for each client. Hence, in a case where the content information image is rented (lent), for example, a time limit management can be performed by setting the "expiration date" for each client.

Further, the content information image providing unit can prohibit the content information image from being taken out offline on a recording medium, for example, by setting "off-lining ability" in the attribute information 309. Alternatively, an information image not allowed to be made offline can be set to be able to go offline.

Further, when the content information image providing unit sets "the copy information cannot be present in a plurality of holders" in the attribute information 309 at the setting of the "plural holdability," the copy information image cannot be present in a plurality of folders each related to an identical user on the folder managing server. Hence, this is synonymous with preventing "recommend" operation for the content information image.

Thus, the setting of the identifying information 307 and the attribute information 309 has effects of enhancing security of the content information image and protecting copyright when the content itself has a copyright.

(7. Decentralization of Information Image Managing Server and Folder Managing Server)

The user managing server 1001 retains an information image managing server location 706 and a folder managing server location 705 for each user in the user managing table 701. Hence, the information image managing server and the folder managing server do not need to be physically centralized, and a plurality of apparatus may be installed in a distributed manner for each of the servers.

(8. Information Image Owner Management)

Accessing the information image managing table 801 from the user managing table 701, a content information image creator can grasp an owner (client 1005) retaining the created content information image. For example, when the client 1005 assigns the content information image to another user, the owner of the content information image is changed to the other user, so that the content information image creator can trace and grasp the user that the content information image is assigned to.

Further, as described above, the content information image creator can change and set a retaining condition and a time limit managing condition for each owner.

(9. Others)

In the present embodiment, an owner and ownership conditions (a retaining condition and a time limit managing condition) of a content information image are managed, so that security can be enhanced.

In addition, since the retaining condition and the time limit managing condition can be set for each owner, it is possible to easily construct a system when content use is billed. That is, rental time limit management and construction of a billing system can be performed easily when the content information image is rented (lent).

All the functions of the servers and the client (including an information terminal apparatus or the like) realized in the above embodiment can be realized by software. For this, necessary software can be distributed via a network or via a recording medium such as a CD-ROM, a DVD-ROM, or the like having a program recorded thereon.

It is to be noted that the technical scope of the present invention is not limited to the foregoing embodiment. It is obvious that various changes and modifications within the scope of the technical concepts as disclosed in the present application will occur to those skilled in the art, and it is therefore understood that they of course fall within the technical scope of the present invention.

As described above in detail, according to the present invention, it is possible to provide a content information image and an information image utilizing system with an access right and an authentication function.

The invention claimed is:

1. An information image utilization system for performing multimedia file management, the system comprising:
   a plurality of clients, each client having a client identifier;
   an information image management server for:
      producing and storing a master information image, the master information image comprising specific information including an information image providing server identifier, wherein the master image is maintained on the information image management server;
      producing and storing first and second copy information images based on the master image;
      adding first attribute data to the first copy image specifying access rights;
      determining a second client owner of the second copy image and adding second attribute data, different from the first attribute data, to the second copy image specifying access rights of the second client owner; and
   an information image providing server for distributing the first copy image to a first client and the second copy image to the second client owner, wherein the first client is different from the second client owner,
   wherein the information image management server:
      updates the first copy image, after the first copy image is distributed to the first client, by adding a first client identifier to the first copy image stored on the information image management server to assign ownership of the first copy image to the first client,
      redistributes the undated first copy image to the first client, and
      stores an information image managing table, which associates an identifier of the master image, an information image providing server identifier, an identifier of the first and second copy images, the first client identifier, and a second client owner identifier.

2. The system of claim 1, further comprising at least one folder managing server that stores a folder managing table associating the first and second copy image identifiers with the client owner identifiers.

3. The system of claim 2, further comprising at least one user managing server that authenticates the client owners and the information image providing server, and further retains a user managing table associating the client owner identifiers with the at least one folder managing server and associating the identifier of the information image providing server with the information image managing server.

4. The system of claim 3, wherein the client owners comprise means for:
   communicating with the folder managing server;
   displaying the first or second copy image corresponding to the client owners; and
   performing a predetermined operation on the basis of the related information and the attribute information included in the first or second copy image.

5. The system of claim 4, wherein the predetermined operation includes at least one of: operation of reproduction of related information included in the first or second copy image; processing for owning the first or second copy image; processing for updating the first or second copy image; processing for recommending the first or second copy image; and processing for assigning the first or second copy image.

6. The system of claim 2, wherein the information image management server is configured to:
   reflect a change in the client owner of the first or second copy image in the information image managing table.

7. The system of claim 6, wherein the at least one information management server is configured to:
   extract the client owner identifier of the first or second copy image;
   notify the information image providing server on the basis of the information image managing table; and
   transmit the client owner identifier of the first or second copy image to the information image providing server in response to a request from the information image providing server.

8. The system of claim 2, wherein the information image management server is configured to update the information image managing table on the basis of an instruction from the information image providing server, wherein the instruction is for:
   changing the attribute information included in the first or second copy image;
   changing related information included in the first or second copy image; or
   deleting the first or second copy image.

9. The system of claim 8, wherein the folder managing server is configured to update the folder managing table on the basis of the instruction from the information image providing server.

10. The system of claim 1, wherein the information image comprises XML data.

11. A method for performing multimedia file management, the method comprising:

producing and storing a master information image, the master information image comprising specific information including an information image providing server identifier, wherein the master image is maintained on the information image management server;

producing and storing first and second copy information images based on the master image;

adding first attribute data to the first copy image specifying access rights;

determining a second client owner of the second copy image and adding second attribute data to the second copy image specifying access rights of the second client owner;

distributing the first copy image to a first client and the second copy image to the second client owner, wherein the first client is different from the second client owner and the first attribute data is different from the second attribute data;

updating the first copy image, after the first copy image is distributed to the first client, by adding a first client identifier to the first copy image stored on the information image management server to assign ownership of the first copy image to the first client;

redistributing the undated first copy image to the first client; and storing an information image managing table, which associates an identifier of the master image, an information image providing server identifier, an identifier of the first and second copy images, the first client identifier, and a second client owner identifier.

12. The method of claim 11, further comprising:

storing a folder managing table associating the first and second copy image identifiers with the client owner identifiers.

13. The method of claim 12, further comprising:

authenticating the client owners and an information image providing server;

retaining a user managing table associating the client owner identifiers with at least one folder managing server; and associating the identifier of the information image providing server with the information image managing server.

14. The method of claim 13, further comprising:

communicating with the folder managing server;

displaying the first or second copy image corresponding to the client owners; and performing a predetermined operation on the basis of related information and the attribute information included in the first or second copy image.

15. The method of claim 14, wherein the predetermined operation includes at least one of:

operation of reproduction of related information included in the first or second copy image;

processing for owning the first or second copy image;

processing for updating the first or second copy image;

processing for recommending the first or second copy image; and processing for assigning the first or second copy image.

16. The method of claim 12, further comprising reflecting a change in the client owner of the first or second copy image in the information image managing table.

17. The method of claim 16, further comprising extracting the client owner identifier of the first or second copy image;

notifying the information image providing server on the basis of the information image managing table; and transmitting the client owner identifier of first or second copy image to the information image providing server in response to a request from the information image providing server.

18. The method of claim 12, further comprising:

updating the information image managing table on the basis of an instruction from the information image providing server, wherein the instruction is for:

changing the attribute information included in the first or second copy image;

changing related information included in the first or second copy image; or deleting the first or second copy image.

19. The system of claim 18, wherein the folder managing server comprises means for:

updating the folder managing table on the basis of the instruction from the information image providing server.

20. The method of claim 11, wherein the information image comprises XML data.

21. A computer-readable medium storing a computer program, which, when executed by a processor, causes the processor to perform a method for multimedia file management, the method comprising:

producing and storing a master information image, the master information image comprising specific information including an information image providing server identifier, wherein the master image is maintained on the information image management server;

producing and storing first and second copy information images based on the master image;

adding first attribute data to the first copy image specifying access rights;

determining a second client owner of the second copy image and adding second attribute data to the second copy image specifying access rights of the second client owner;

distributing the first copy image to a first client and the second copy image to the second client owner, wherein the first client is different from the second client owner and the first attribute data is different from the second attribute data;

updating the first copy image, after the first copy image is distributed to the first client, by adding a first client identifier to the first copy image stored on the information image management server to assign ownership of the first copy image to the first client;

redistributing the updated first copy image to the first client; and storing an information image managing table, which associates an identifier of the master image, an information image providing server identifier, an identifier of the first and second copy images, the first client identifier, and a second client owner identifier.

* * * * *